(12) United States Patent
Jain

(10) Patent No.: US 9,207,993 B2
(45) Date of Patent: Dec. 8, 2015

(54) DYNAMIC APPLICATION PLACEMENT BASED ON COST AND AVAILABILITY OF ENERGY IN DATACENTERS

(75) Inventor: Navendu Jain, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 783 days.

(21) Appl. No.: 12/779,059

(22) Filed: May 13, 2010

(65) Prior Publication Data

US 2011/0282982 A1    Nov. 17, 2011

(51) Int. Cl.
G06F 15/173    (2006.01)
G06F 9/50    (2006.01)

(52) U.S. Cl.
CPC ............ *G06F 9/5094* (2013.01); *Y02B 60/142* (2013.01)

(58) Field of Classification Search
CPC ..... G06F 9/5094; G06F 8/4432; H04W 40/10
USPC ....................................................... 709/223
See application file for complete search history.

(56) References Cited

U.S. PATENT DOCUMENTS

| | | | |
|---|---|---|---|
| 5,576,700 A | 11/1996 | Davis et al. | |
| 6,263,315 B1 | 7/2001 | Talluri | |
| 6,452,289 B1 | 9/2002 | Lansberry | |
| 6,795,928 B2 | 9/2004 | Bradley et al. | |
| 6,868,682 B2 | 3/2005 | Sharma et al. | |
| 7,110,913 B2 | 9/2006 | Monroe et al. | |
| 7,111,061 B2 | 9/2006 | Leighton et al. | |
| 7,127,625 B2 | 10/2006 | Farkas et al. | |
| 7,135,956 B2 | 11/2006 | Bartone et al. | |
| 7,136,830 B1 | 11/2006 | Kuelbs et al. | |
| 7,272,735 B2 | 9/2007 | Fung | |
| 7,318,154 B2 | 1/2008 | Tehee | |

(Continued)

FOREIGN PATENT DOCUMENTS

| | | |
|---|---|---|
| CN | 100458605 C | 2/2009 |
| CN | 101430596 A | 5/2009 |

(Continued)

OTHER PUBLICATIONS

L. Liu, H. Wang, X. Liu, X. Jin, W.B. He, Q.B. Wang, and Y. Chen, GreenCloud: a new architecture for green data center, Proceedings of the 6th international conference industry session on Autonomic computing and communications industry session, Barcelona, Spain: ACM, 2009, pp. 29-38.*

(Continued)

*Primary Examiner* — June Sison
(74) *Attorney, Agent, or Firm* — Alin Corie; Sandy Swain; Micky Minhas

(57) ABSTRACT

An optimization framework for hosting sites that dynamically places application instances across multiple hosting sites based on the energy cost and availability of energy at these sites, application SLAs (service level agreements), and cost of network bandwidth between sites, just to name a few. The framework leverages a global network of hosting sites, possibly co-located with renewable and non-renewable energy sources, to dynamically determine the best datacenter (site) suited to place application instances to handle incoming workload at a given point in time. Application instances can be moved between datacenters subject to energy availability and dynamic power pricing, for example, which can vary hourly in day-ahead markets and in a time span of minutes in realtime markets.

21 Claims, 13 Drawing Sheets

(56) References Cited

U.S. PATENT DOCUMENTS

| | | |
|---|---|---|
| 7,321,221 B2 | 1/2008 | Bucker et al. |
| 7,365,973 B2 | 4/2008 | Rasmussen et al. |
| 7,373,268 B1 | 5/2008 | Viredaz et al. |
| 7,379,884 B2 | 5/2008 | Barsness |
| 7,437,730 B2 | 10/2008 | Goyal |
| 7,484,111 B2 | 1/2009 | Fung |
| 7,500,001 B2 | 3/2009 | Tameshige et al. |
| 7,525,207 B2 | 4/2009 | Clidaras et al. |
| 7,551,130 B2 | 6/2009 | Altenschulte |
| 7,552,350 B2 | 6/2009 | Fung |
| 7,560,823 B2 | 7/2009 | Schellings |
| 7,568,360 B1 | 8/2009 | Bash et al. |
| 7,604,535 B2 | 10/2009 | Germagian et al. |
| 7,606,719 B2 | 10/2009 | Barsness |
| 7,608,937 B1 | 10/2009 | Altenschulte |
| 7,711,587 B2 | 5/2010 | De Marcken |
| 7,752,858 B2 | 7/2010 | Johnson et al. |
| 7,797,563 B1 | 9/2010 | Moll |
| 7,820,321 B2 | 10/2010 | Horne |
| 7,881,057 B2 | 2/2011 | Fink |
| 7,903,407 B2 | 3/2011 | Matsushima et al. |
| 7,923,965 B2 | 4/2011 | Ritter |
| 7,961,463 B2 | 6/2011 | Belady et al. |
| 8,041,967 B2 | 10/2011 | Belady et al. |
| 8,080,898 B2 | 12/2011 | Fukuhara |
| 8,080,900 B2 | 12/2011 | Corhodzic |
| 8,082,454 B2 | 12/2011 | Totten |
| 8,145,731 B2 | 3/2012 | Cherkasova et al. |
| 8,164,897 B2 | 4/2012 | Graybill |
| 8,189,561 B2 | 5/2012 | Karaoguz et al. |
| 8,225,119 B2 | 7/2012 | Jain |
| 8,458,011 B2 | 6/2013 | Al-Dawsari et al. |
| 2002/0004913 A1 | 1/2002 | Fung |
| 2002/0152305 A1 | 10/2002 | Jackson et al. |
| 2003/0079151 A1 | 4/2003 | Bohrer et al. |
| 2003/0101263 A1 | 5/2003 | Bouillet et al. |
| 2003/0115495 A1 | 6/2003 | Rawson |
| 2003/0193777 A1 | 10/2003 | Friedrich et al. |
| 2003/0196126 A1 | 10/2003 | Fung |
| 2004/0177057 A1 | 9/2004 | Fairchild et al. |
| 2005/0132051 A1 | 6/2005 | Hill |
| 2005/0190912 A1 | 9/2005 | Hopkins et al. |
| 2005/0193113 A1 | 9/2005 | Kokusho |
| 2005/0241810 A1 | 11/2005 | Malone et al. |
| 2005/0256952 A1 | 11/2005 | Mouhanna et al. |
| 2006/0036878 A1 | 2/2006 | Rothman |
| 2006/0041537 A1 | 2/2006 | Ahmed |
| 2006/0080213 A1 | 4/2006 | Inoue |
| 2006/0184287 A1 | 8/2006 | Belady et al. |
| 2006/0277109 A1 | 12/2006 | Kerth et al. |
| 2007/0049133 A1 | 3/2007 | Conroy |
| 2007/0097636 A1 | 5/2007 | Johnson et al. |
| 2007/0130341 A1 | 6/2007 | Ma |
| 2007/0136392 A1* | 6/2007 | Oh et al. .......... 707/201 |
| 2007/0250838 A1 | 10/2007 | Belady et al. |
| 2007/0294408 A1 | 12/2007 | Jackson |
| 2008/0030078 A1 | 2/2008 | Whitted |
| 2008/0049714 A1 | 2/2008 | Commarford et al. |
| 2008/0072090 A1 | 3/2008 | O'Connor |
| 2008/0141048 A1 | 6/2008 | Palmer |
| 2008/0201720 A1 | 8/2008 | Betzler |
| 2008/0234873 A1 | 9/2008 | Gorbatov et al. |
| 2008/0255899 A1 | 10/2008 | McConnell et al. |
| 2008/0313101 A1 | 12/2008 | Helander et al. |
| 2008/0316938 A1 | 12/2008 | Shi |
| 2009/0063122 A1 | 3/2009 | Nasle |
| 2009/0106571 A1 | 4/2009 | Low et al. |
| 2009/0119233 A1* | 5/2009 | Dunagan et al. ........ 705/412 |
| 2009/0215375 A1 | 8/2009 | Hagensen |
| 2009/0228726 A1 | 9/2009 | Malik et al. |
| 2009/0229194 A1 | 9/2009 | Armillas |
| 2009/0248854 A1 | 10/2009 | Conway |
| 2009/0251860 A1 | 10/2009 | Belady et al. |
| 2009/0254660 A1* | 10/2009 | Hanson et al. .......... 709/226 |
| 2009/0265568 A1 | 10/2009 | Jackson |
| 2009/0265704 A1 | 10/2009 | Branda et al. |
| 2009/0271046 A1 | 10/2009 | Lewis |
| 2009/0276771 A1 | 11/2009 | Nickolov et al. |
| 2009/0279444 A1 | 11/2009 | Ravindran |
| 2009/0281846 A1 | 11/2009 | Rose |
| 2009/0295167 A1 | 12/2009 | Clidaras et al. |
| 2009/0319090 A1* | 12/2009 | Dillon et al. .......... 700/291 |
| 2010/0003545 A1 | 1/2010 | Horne et al. |
| 2010/0020806 A1 | 1/2010 | Vahdat et al. |
| 2010/0037038 A1 | 2/2010 | Bieswanger |
| 2010/0049616 A1 | 2/2010 | Hipsher |
| 2010/0050172 A1 | 2/2010 | Ferris |
| 2010/0057641 A1* | 3/2010 | Boss et al. .......... 705/412 |
| 2010/0058350 A1* | 3/2010 | Boss et al. .......... 718/104 |
| 2010/0061250 A1 | 3/2010 | Nugent et al. |
| 2010/0088150 A1 | 4/2010 | Mazhar et al. |
| 2010/0088205 A1 | 4/2010 | Robertson |
| 2010/0100696 A1 | 4/2010 | Suzuki |
| 2010/0145801 A1 | 6/2010 | Chekuri |
| 2010/0191998 A1 | 7/2010 | Moore |
| 2010/0211669 A1* | 8/2010 | Dalgas et al. .......... 709/224 |
| 2010/0218005 A1 | 8/2010 | Jain |
| 2010/0218186 A1 | 8/2010 | Wolfe et al. |
| 2010/0228819 A1 | 9/2010 | Wei |
| 2010/0235903 A1 | 9/2010 | Carter et al. |
| 2010/0248609 A1 | 9/2010 | Tresh et al. |
| 2010/0250358 A1 | 9/2010 | Elkins, II et al. |
| 2010/0306776 A1 | 12/2010 | Greene |
| 2010/0318454 A1 | 12/2010 | Warncke et al. |
| 2010/0319004 A1 | 12/2010 | Hudson et al. |
| 2010/0332401 A1 | 12/2010 | Prahlad et al. |
| 2010/0333105 A1 | 12/2010 | Horvitz et al. |
| 2010/0333116 A1 | 12/2010 | Prahlad et al. |
| 2011/0016214 A1 | 1/2011 | Jackson |
| 2011/0035072 A1* | 2/2011 | Jackson .......... 700/291 |
| 2011/0055034 A1 | 3/2011 | Ferris et al. |
| 2011/0099095 A1 | 4/2011 | Moore et al. |
| 2011/0105015 A1 | 5/2011 | Carlson |
| 2011/0131309 A1 | 6/2011 | Akiyama et al. |
| 2011/0138708 A1 | 6/2011 | Chazelle et al. |
| 2011/0161526 A1 | 6/2011 | Ravindran |
| 2011/0205949 A1 | 8/2011 | Maenpaa et al. |
| 2011/0208606 A1 | 8/2011 | Hadar et al. |
| 2011/0231552 A1 | 9/2011 | Carter et al. |
| 2011/0240265 A1 | 10/2011 | Dechene |
| 2011/0278928 A1 | 11/2011 | Burger et al. |
| 2011/0282982 A1 | 11/2011 | Jain |
| 2011/0288898 A1 | 11/2011 | Roe |
| 2011/0296019 A1 | 12/2011 | Ferris |
| 2012/0016721 A1 | 1/2012 | Weinman |
| 2012/0030356 A1 | 2/2012 | Fletcher |
| 2012/0089726 A1 | 4/2012 | Doddavula |
| 2012/0095940 A1 | 4/2012 | Borgs et al. |
| 2012/0109705 A1 | 5/2012 | Belady et al. |
| 2012/0115433 A1 | 5/2012 | Young |
| 2012/0130554 A1 | 5/2012 | Jain et al. |
| 2012/0158447 A1 | 6/2012 | Jain et al. |
| 2012/0259760 A1 | 10/2012 | Sgouridis et al. |
| 2012/0290725 A1 | 11/2012 | Podila |
| 2012/0330711 A1 | 12/2012 | Jain et al. |
| 2012/0331113 A1 | 12/2012 | Jain et al. |
| 2014/0365402 A1 | 12/2014 | Belady et al. |

FOREIGN PATENT DOCUMENTS

| | | |
|---|---|---|
| CN | 101096942 A | 3/2013 |
| JP | 2003-162591 | 6/2003 |
| JP | 2006-508445 A | 3/2006 |
| JP | 2007-249470 | 9/2007 |
| JP | 2007-324956 A | 12/2007 |
| JP | 2003-324956 | 11/2013 |
| KR | 1020090120704 | 11/2009 |

(56) References Cited

FOREIGN PATENT DOCUMENTS

| WO | 2004049157 A2 | 6/2004 |
|---|---|---|
| WO | 20091012451 | 1/2009 |
| WO | 20101010544 | 1/2010 |

OTHER PUBLICATIONS

Chen, et al., "Energy-Aware Server Provisioning and Load Dispatching for Connection-Intensive Internet Services", Retrieved at << http://research.microsoft.com/en-us/um/people/zhao/pubs/nsdi08_xiao.pdf >>, Proceedings of the 5th USENIX Symposium on Networked Systems Design and Implementation, Apr. 16-18, 2008.
Chase, et al., "Managing Energy and Server Resources in Hosting Centers", Retrieved at << http://cseweb.ucsd.edu/~vandat/papers/muse-sosp01.pdf >>, ACM SIGOPS Operating Systems Review, vol. 35, no. 5, Dec. 2001.
Ardagna, et al., "SLA Based Profit Optimization in Multi-tier Systems", Retrieved at << http://ieeexplore.ieee.org/stamp/stamp.jsp?tp=&arnumber=1565967 >>, NCA, Proceedings of the Fourth IEEE International Symposium on Network Computing and Applications, Jul. 27-29, 2005.
Karve, et al., "Dynamic Placement for Clustered Web Applications", Retrieved at << http://citeseerx.ist.psu.edu/viewdoc/download?doi=10.1.1.80.7874&rep=rep1&type=pdf >>, International World Wide Web Conference, Proceedings of the 15th international conference on World Wide Web, May 23-26, 2006.
Qureshi, et al., "Cutting the electric bill for Internet-scale systems", Retrieved at << http://nms.csail.mit.edu/papers/sigcomm372-aqureshi.pdf >>, Applications, Technologies, Architectures, and Protocols for Computer Communication, Proceedings of the ACM SIGCOMM 2009 conference on Data communication, Aug. 16-21, 2009.
Rao, et al., "Minimizing Electricity Cost: Optimization of Distributed Internet Data Centers in a Multi-Electricity-Market Environment", Retrieved at<< http://mc.eistar.net/Paper/INFOCOM_RAO.pdf >>, in Proceedings of IEEE Conference on Computer Communications, (INFOCOM), 2010.
U.S. Appl. No. 12/492,385, filed Jun. 26, 2009.
U.S. Appl. No. 12/391,188, filed Feb. 23, 2009.
U.S. Appl. No. 12/781,445, filed May 17, 2010.
U.S. Appl. No. 12/913,763, filed Oct. 28, 2010.
U.S. Appl. No. 12/951,977, filed Nov. 22, 2010.
U.S. Appl. No. 12/973,399, filed Dec. 20, 2010.
U.S. Appl. No. 12/903,227, filed Oct. 13, 2010.
U.S. Appl. No. 13/169,923, filed Jun. 27, 2011.
U.S. Appl. No. 13/169,890, filed Jun. 27, 2011.
"Notice of Allowance," Mailed on Dec. 24, 2014, from U.S. Appl. No. 12/951,977, 7 pages.
"Amendment after Notice of Allowance (Rule 312)," Filed on Jan. 22, 2015, from U.S. Appl. No. 12/951,977, 10 pages.
"Notice on the Third Office Action," Mailed on Dec. 31, 2014, from Chinese Patent Application No. 201080009556.7, 7 pages.
"Decision on Reexamination," Mailed on Dec. 16, 2014, from Chinese Patent Application No. 201080009556.7, 3 pages.
"Examination Report," Mailed on Oct. 17, 2014, from European Patent Application No. 10744134.7, 7 pages.
"Notice of Allowance," Mailed on Nov. 11, 2014, from Japanese Patent Application No. 2011-551110, pages.
"Response to Final Office Action," Mailed on Nov. 14, 2014, from Chinese Patent Application No. 201080009555561, pages.
"First Office Action," Mailed on Sep. 16, 2014, from Chinese Patent Application No. 201180024779.5, pages.
Notice of Allowance mailed Apr. 15, 2015 From U.S. Appl. No. 12/951,977. 8 Pages.
"European Search Report," From European Patent Application No. 12803686.0, Mailed Date: Oct. 28, 2014, 3 pages.
"Office Action," From European Patent Application No. 12803686.0, Mailed Date: Dec. 1, 2104, 4 pages.

Beloglazov et al., "SLA Based Profit Optimization in Multi-Tier Systems", in Proceedings of the 4th IEEE International Symposium on Network Computing and Applications, Jul. 27-29, 2005, 4 pages.
Chaver et al., "Energy-Aware Fetch Mechanism: Trace Cache and BTB Customization", in Proceedings of the 2005 International Symposium on Lower Power Electronics and Design, Aug. 8-10, 2005, 6 pages.
Clark et al., "Live Migration of Virtual Machines", in Proceedings of the 2nd ACM/USENIX Symposium on Networked Systems Design & Implementation, May 2-4, 2005, 14 pages.
Giannakoudis et al., "Optimum design and operation under uncertainty of power systems using renewable energy sources and hydrogen storage", International Journal of Hydrogen Energy, ScienceDirect, Available online Nov. 27, 2009, 20 pages.
Gmach et al., "Capacity Planning and Power Management to Exploit Sustainable Energy", in Proceedings of the 6th International Conference on Network and Service Management, Oct. 25-29, 2010, 8 pages.
Kant, Krishna, "Power Control of High Speed Network Interconnects in Data Centers", in Proceedings of the 28th IEEE International Conference on Computer Communications, Apr. 19-25, 2009, 6 pages.
Kant, Krishna, "Distributed Energy Adaptive Computing", IEEE International Conference on Communications, May 23-27, 2010, 5 pages.
Kant, Krishna, "Data center evolution: A tutorial on state of the art issues, and challenges", Computer Networks, Nov. 12, 2009, 27 pages.
Le et al., "Managing the Cost, Energy Consumption, and Carbon Footprint of Internet Services", SIGMETRICS'10, Jun. 14-18, 2010, 2 pages.
Verma et al., "Brownmap: Enforcing Power Budget in Shared Data Centers", IBM Research Report, Dec. 17, 2009, 15 pages.
"Solar Chimney", Wikipedia, Published on or before Feb. 27, 2005, 5 pages.
"Solar updraft tower", Wikipedia, Published on or before Aug. 30, 2006, 6 pages.
Bansal et al., "Randomized Competitive Algorithms for Generalized Caching", Retrieved at <<http://research.microsoft.com/en-us/um/people/nivbuchb/papers/web-caching/web-caching.pdf>>, May 17-20, 2008, 10 pages.
Bansal et al., "Towards the Randomized K-Server Conjecture: A Primal-Dual Approach", Retrieved at <<http://domino.research.ibm.com/comm/research_people.nsf/pages/nikhil.pubs.html/$File/extended-primal-dual.pdf>>, Jan. 17, 2010, 24 pages.
Bansal et al., "A Primal-Dual Randomized Algorithm for Weighted Paging", Retrieved at <<http://www.cs.technion.ac.il~nivb/papers/weighted-paging.pdf, 2007, 11 pages.
Burger, "Wind-Powered Data Center", U.S. Appl. No. 12/781,445, Filed May 17, 2010, 26 pages.
"Zeus Launches Data Center Load Balancing Solution"; retrieved at http://www.continuitycentral.com/news03343.htm, Continuity Central; Jun. 28, 2007; 1 page.
Windows Azure Platform, Retrieved at<<http://www.azure.com>>, 2 Pages.
Bianchini, "Power and Energy Management for Server Systems", IEEE Computer, vol. 37, No. 11, Nov. 2004, 11 pages.
Borgs, "Pricing Mechanisms for Perishable Time-Varying Resources", U.S. Appl. No. 12/903,227, Filed: Oct. 13, 2010.
Felter, "A Performance-Conserving Approach for Reducing Peak Power Consumption in Server Systems", Proceedings of the 19th Annual International Conference on Supercomputing, Jun. 20-22, 2005, 10 pages.
Horvitz, "Precomputation for Data Center Load Balancing", U.S. Appl. No. 12/492,385, Filed: Jun. 26, 2009.
Iranli, "System-Level Power Management: An Overview", In The VLSI Handbook Second Edition, CRC Press, Dec. 26, 2006, 22 pages.
Jain, "SLA-Integrated Pricing Models for Cloud Computing", Microsoft Research, Oct. 18, 2010, 5 pages.
Jain, "An Optimization Framework for Dynamic Client-Server Partitioning in the IMA Application", Apr. 16, 2010, 3 pages.

(56) References Cited

OTHER PUBLICATIONS

Jain, "Dynamically Placing Computing Jobs", U.S. Appl. No. 12/951,977, Filed: Nov. 22, 2010.
Jain, "Pricing Batch Computing Jobs at Data Centers", U.S. Appl. No. 12/973,399, Filed: Dec. 20, 2010.
Jiang et al., "Enabling Autonomic Power-Aware Management of Instrumented Data Centers", Retrieved at<<http://ieeexplore.ieee.org/stamp/stamp.jsp?arnumber=05160976>>, 2009, 8 Pages.
Kahn, C.; "As power demand soars, grid holds up . . . so far"; Jul. 7, 2010; Associated Press; 1 page.
"Levin, Y. et al.; "Dynamic Pricing in the Presence of Strategic Consumers and Oligopolistic Competition"; Management Science; vol. 55, No. 1; Jan. 2009; pp. 32-46."
Levin, Y. et al.; "Optimal Dynamic Pricing of Perishable Items by a Monopolist Facing Strategic Consumers"; Production and Operations Management; 2009; 53 pages.
Li et al.; "Load Balancing for Multi-tiered Database Systems through Autonomic Placement of Materialized Views"; Proceedings of the 22nd International Conference on Data Engineering (ICDE 2006); 2006; 12 pages.
McGeehan, Patrick, "Heat Wave Report: 102 Degrees in Central Park", Retrieved at<<http://cityroom.blogs.nytimes.com/2010/07/06/ heatwave-report-the-days-first-power-loss/?hp>>, Jul. 6, 2010, 17 Pages.
Pauley, W.A.; "Cloud Provider Transparency: An Empirical Evaluation"; IEEE Security and Privacy; vol. 8, No. 6; Aug. 19, 2010; pp. 32-39.
Perry, Michael, "Australian Greens Propose a$23/ton Carbon Tax", Retrieved at <<http://uk.reuters.com/article/iduktre65s2u920100629>>, Jan 29, 2010, 2 Pages.
Pflueger, et al.; "Data Center Efficiency in the Scalable Enterprise"; Dell Power Solutions; Feb. 2007; pp. 8-14.
Popa, R.A. et al.; "Enabling Security in Cloud Storage SLAs with CloudProof"; Microsoft Research Technical Report. MSR-TR-2010-46; May 2010; pp. 1-12.
Rasmussen, N.; "Implementing Energy Efficient Data Centers"; White Paper #114; American Power Conversion; Retrieved at http://www.apcmedia.com/ salestools/NRAN-6LXSHX_R0_EN.pdf; 2006; pp. 1-15.
Sleator, et al., "Amortized Efficiency of List Update and Paging Rules", Retrieved at<<http://www.google.co.in/url?sa=t&source=web&cd=1&ved=0CBUQFJAA&url=http%3A%2F%2Fciteseerx.ist.psu.edu%2Fviewdoc%2Fdownload%3Fdoi%3D10.1.1.90.3388%26rep%3Drep1%26type%3Dpdf&rct=j&q=Amortized%20efficiency%20of%20list%20update%20and%20paging%20rules&ei=IIIhaTNvYINTP4gad6MWeAg&usg=AFQjCN FIS_H9stkUtfKpRwHtZ6HZLQX-oNg>>, vol. 28, No. 2, Feb. 1985, pp. 202-208.
El Sweeting, A.; "Dynamic Pricing Behavior in Perishable Goods Markets: Evidence from Secondary Markets for Major League Baseball Tickets"; Duke University; Feb. 2010; pp. 1-65.
Timmer, J.; "Renewable Energy and the Future of the Datacenter"; Arstechnica.com business news; May 2008; 2 pages.
Urgaonkar, "Dynamic Provisioning of Multi-Tier Internet Applications", In Proceedings of the Second International Conference on Autonomic Computing, Jun. 13-16, 2005, 12 pages.
USENIX, "Technical Sessions", 5th USENIX Symposium on Networked Systems Design and Implementation, Apr. 16-18, 2008, 4 pages.
Vazirani, V.; "Approximation Algorithms"; Springer; 2001; 396 pages.
Wang, C. et al.; "Markdown Money Contracts for Perishable Goods with Clearance Pricing"; European Journal of Operational Research; vol. 196; 2009; pp. 1113-1122.
Wang, "Feedback Control Algorithms for Power Management of Servers", Third International Workshop on Feedback Control Implementation and Design in Computing Systems and Networks, Jun. 6, 2008.
"Zhang, Q.; "Cloud Computing: State-of-the-Art and Research Challenges"; Journal of Internet Services and Applications; vol. 1 (1); May 2010; Published online Apr. 20, 2010;pp. 7-18."
"PlateSpin Recon"; retrieved on May 11, 2009 at http://www.novell.com/products/recon/ consolidation_ratios.html, Novell, Inc.; 2009; 2 pages.
"Sensible Cloud: What is an SLA?"; http://www.sensiblecloud.com/2010/11/what-is-slai/; Retrieved Mar. 24, 2011; 8 pages.
"International Search Report," PCT Patent Application No. PCT/US2011/036364; Mailed Dec. 23, 2011; 8 pages.
"International Search Report," From PCT Patent Application No. PCT/US2012/042110; Mailed Jan. 31, 2013, 9 Pages.
"International Search Report and Written Opinion" for PCT Patent Application No. PCT/US2010/023253, Mailed Sep. 30, 2010, 9 pages.
Bansal et al., "Metrical Task Systems and the k-Server Problem on HSTs", Proceedings of the 37th International Colloquium on Automata, Languages and Programming, Jul. 6-10, 2010, 12 pages.
Bartal, et al., "A Polylog (N)-Competitive Algorithm for Metrical Task Systems", Retrieved at <<http://www.google.co.in/url?sa=t&source=web&cd=5&ved=0CC4QFjAE&url=http%3A%2F%2Fciteseerxist.psu.edu%2Fviewdoc%2Fdownload%3Fdoi%3D10.1.1.39.3857%26rep%3Drep1%26type%3Dpdf&rct=j&q=A%20polygon(n)-competitive%20algorithm%20for%20metrical%20task%20systems&ei=BIJaTPSsOYH_4AbO_-2EAg&usg=AFQCNEdMbYyyaLhQ01jYc-1VAhdalpAeA>>, 1997, 9 pages.
Battles et al., "Reducing Data Center Power Consumption through Efficient Storage", Network Applianc, Inc., Sunnyvale, CA, WP-7010-0207, Feb. 2007, 9 pages.
Belady, Chrstian L., "In the data center, power and cooling costs more than the it equipment it supports", Retreived at <<http://www.electronics-cooling.com/2007/02/in-the-data-center-power-and-cooling-costs-more-than-the- it-equipment-it-supports/>>, Feb. 1, 2007, 6 pages.
Bonvin, N. et al., "Autonomic SLA-driven Provisioning for Cloud Applications", 11th IEEE/ACM International Symposium on Cluster, Cloud and Grid Computing (CCGrid), May 23-26, 2011, Published online Feb. 2011, 10 pages.
Borgs et al., "Optimal Mechanisms for Perishable Goods With Variable Supply and Demand", Aug. 11, 2010, 8 pages.
Borenstein et al., "Dynamic Pricing, Advanced Metering, and Demand Response in Electricity Markets", University of California Energy Institute, 2002, 102 pages.
Borodin et al., "Online Computation and Comptetive Analysis", Retrieved at <<http://www.google.co.in/url?sa=t&source=web&cd=5&ved=0CC4QFjAE&url=http%3A%2F%2Fwww.gbv.de%2Fdrns%2Fgoettingen%2F236832409.pdf&rct=j&q=Online%20computation%20and%20competitive%20analysis&ei=r4NaTIzROsij4Abe81TxAQ&usg=AFQjCEFoECsmmMPoASVdvcymLwjcVO4qg>>, 1998, 6 pages.
Borodin et al., "An Optimal On-Line Algorithm for Metrical Task System", Retrieved at <<http://www.google.co.in/url?sa=t&source=web&cd=3&ved=0CCMQFjAC&url=http%3A%2A%2Fciteseerx.ist.psu.edu%2Fviewdoc%2Fdownload%3Fdoi%3D10.1.1.74.7160%26rep%3Drep1%26type%Dpdf&rct=j&q=an%20optimal%20on-line%20algorithm%20for%20metrical%20task%20system&ei=4NaTMuECMrS4galtq3-Aq&usg=AFQjCNFYrRVoLBy9GJ5Cfpc8vF342tpNXg>>, Sep. 1992, 19 pages.
Buchbinder et al., "The Design of Competitive Online Algorithms Via a Primaldual Approach", Retrieved at <<http://research.microsoft.com/en-us/um/people/nivbuchbpapers/pd-survey.pdf.>> 2007, 174 pages.
Buchbinder et al., "Online Job-Migration for Reducing the Electricity Bill in the Cloud", Lecture Notes in Computer Science, Networking 2011 Proceedings of the 10th International IFIP TC 6 Conference on Networking, vol. 6640, Part I, 2011, pp. 172-185.

(56) References Cited

OTHER PUBLICATIONS

Butler, Declan, "France Unvels Carbon Tax", Retrieved at http://www.nature.com/news/2009/090911/full/news2009.905.html, Jan. 29, 2010, 2 pages.
Buyya, R. et al.; "Cloudbus Toolkit for Market-Oriented Cloud Computing"; Proceedings of the 1st International Conference on Cloud Computing; Oct. 11, 2009; pp. 24-44.
Chatwin, R.E.; "Optimal Dynamic Pricing of Perishable Products with Stochastic Demand and a Finite Set of Prices"; European Journal of Operational Research 125 (2000); Aug. 1, 1997; pp. 149-174.
Cho, et al.; "Strategic Consumer Response to Dynamic Pricing of Perishable Products"; International Series in Operations Research & Management Science; vol. 131; Aug. 2008; pp. 435-458.
Dasu, S. et al.; "Dynamic pricing when consumers are strategic: Analysis of a posted pricing scheme"; European Journal of Operational Research; vol. 204, Issue 3; 2010; pp. 1-23.
Dunn, D.; "Data Center Energy Efficiency Through BCM"; Industry Perspectives; Jan. 2010; 7 pages.
Fan, X. et al.; "Power Provisioning for a Warehouse-sized Computer"; Proceedings of the ACM International Symposium on Computer Architecture; Jun. 2007; 11 pages.
Fiat, et al., "Better Algorithms for Unfair Metrical Task Systems and Applications", Retrieved at<<http://citeseerx.ist.psu.edu/viewdoc/download?doi=10.1.1.21.7258&rep=rep1&type=pdf>>, 2000, pp. 20.
Grossman, R.L.; "The Case for Cloud Computing"; IT Professional; vol. 11, No. 2; Mar. 21, 2009; pp. 23-27.
Harrison, A., "Symantec Energy Efficient Data Center Solutions," Symantec Corporation, Cupertino, CA; Jan. 12, 2008; 15 pages.
Carbon Tax Center, Retrieved at <<www.carbontax.org>>, Aug. 5, 2010, pp. 7.
"Consultants: How and Why Pay Per Performance Works (Part 2—Continuation from Last Post)"; Weblog posting published Apr. 4, 2010; http://bizrelationships.wordpress.com/2010/04/19/consultants-how-and-why-pay-perperformance-works-part-2-continuation-from-last-post ; 5 pages.
"Data Center Efficiency in the Scalable Enterprise"; reprinted from Dell Power Solutions; Dell Inc.; Feb. 2007; 7 pages.
"Carbon Dioxide Emissions from the Generation of Electric Power in the United States"; http://www.eia.gov/cneaf/electricity/p./co2_report/co2report.html; Jul. 2000.
"ASG-Workload Optimization Suite for Comprehensive Workload Analysis and Forecasting"; Allen Systems Group, Inc.; 2009; 1 page.
"About Vibes Interactive"; Vibes Interactive LLC; http://www.vibesinteractive.com/about_us.html; 2010; 2 pages.
"Leading the Evolution of the Data Center," Brocade Communications Systems, Inc., San Jose, CA; 2008; 8 pages.
"Managing Energy Efficiency in the Data Center," EMC Corporation, Hopkinton, MA; 2008; 6 pages.
Jain, "Energy-Aware Server Management", U.S. Appl. No. 12/391,188, Filed: Feb. 23, 2009.
"Tout+Interactive"; Latest Publication Mar. 22, 2011; Earlier weblog entries published on Mar. 19, 2011; Mar. 18, 2011; Mar. 7, 2011; Mar. 6, 2011; and Nov. 29, 2010; http://toutinteractive.com/; 8 pages.
"Response to Third Office Action," From Chinese Patent Application No. 201080009556.7, Filed Date: Mar. 4, 2015, 15 pages.
"Non-final Office Action," From U.S. Appl. No. 12/781,445, Mailed Date: Sep. 23, 2014, 12 pages.
"Response to Office Action," From European Patent Application No. 10744134.7, Filed on Feb. 16, 2015, 11 pages.
"Amendment," From U.S. Appl. No. 14/464,650, Filed Date: Aug. 20, 2014, 8 pages.
"Non-final Office Action," From U.S. Appl. No. 12/973,399, Mailed Date: Jul. 3, 2014, 26 pages.
"Response to Non-final Office Action," From U.S. Appl. No. 13/169,923, Filed Feb. 9, 2015, 19 pages.
"Response to Non-final Office Action," From U.S. Appl. No. 13/169,890, Filed Feb. 17, 2015, 19 pages.
"Second Office Action," From Japanese Patent Application No. 2011551110, Mailed Date: Mar. 11, 2014, 11 pages.
"Response to Second Office Action," From Japanese Patent Application No. 2011551110, Filed Date: Jun. 10, 2014, 16 pages.
"Response to Second Office Action," From Chinese Patent Application No. 201080009556.7, Filed Date: Apr. 30, 2014, 16 pages.
"Final Office Action," From Chinese Patent Application No. 201080009556.7, Mailed Date: Jul. 31, 2014, 7 pages.
"Second Office Action," From Chinese Patent Application No. 201080009556.7, Mailed Date: Feb. 21, 2014, 10 pages.
Response filed Aug. 24, 2015 to Final Office Action mailed May 14, 2015 from U.S. Appl. No. 13/169,923, 16 pages.
Non-Final Office Action mailed Apr. 3, 2013 from U.S. Appl. No. 12/781,445, 11 pages.
Response filed Aug. 2, 2013 to Non-Final Office Action mailed Apr. 3, 2013 from U.S. Appl. No. 12/781,445, 14 pages.
Non-Final Office Action mailed Oct. 7, 2011 from U.S. Appl. No. 12/492,385, 14 pages.
Response filed Jan. 6, 2012 to Non-Final Office Action mailed Oct. 7, 2011 from U.S. Appl. No. 12/492,385, 15 pages.
Final Office Action mailed Mar. 15, 2012 from U.S. Appl. No. 12/492,385, 16 pages.
Response filed Jul. 16, 2012 to Final Office Action mailed Mar. 15, 2012 from U.S. Appl. No. 12/492,385, 17 pages.
Notice of Allowance mailed Feb. 19, 2013 from U.S. Appl. No. 12/492,385, 6 pages.
Notice of Allowance mailed Jul. 18, 2013 from U.S. Appl. No. 12/492,385, 6 pages.
Requirement for Restriction/Election mailed Feb. 1, 2013 from U.S. Appl. No. 12/903,227, 6 pages.
Response filed Feb. 27, 2013 to Requirement for Restriction/Election mailed Feb. 1, 2013 from U.S. Appl. No. 12/903,227, 7 pages.
Non-Final Office Action mailed Mar. 29, 2013 from U.S. Appl. No. 12/903,227, 16 pages.
Response filed Aug. 22, 2013 to Non-Final Office Action mailed Mar. 29, 2013 from U.S. Appl. No. 12/903,227, 13 pages.
Non-Final Office Action mailed May 17, 2013 from U.S. Appl. No. 13/169,923, 11 pages.
Response filed Sep. 6, 2013 to Non-Final Office Action mailed May 17, 2013 from U.S. Appl. No. 13/169,923, 14 pages.
Restriction/Election mailed Feb. 28, 2013 from U.S. Appl. No. 13/169,890, 6 pages.
Response filed Mar. 18, 2013 to Restriction/Election mailed Feb. 28, 2013 from U.S. Appl. No. 13/169,890, 11 pages.
Non-Final Office Action mailed Apr. 15, 2013 from U.S. Appl. No. 13/169,890, 10 pages.
Response filed Aug. 15, 2013 to Non-Final Office Action mailed Apr. 15, 2013 from U.S. Appl. No. 13/169,890, 12 pages.
Final Office Action mailed Oct. 9, 2013 from U.S. Appl. No. 13/169,890, 11 pages.
Non-Final Office Action mailed Aug. 1, 2011 from U.S. Appl. No. 12/391,188, 12 pages.
Response filed Nov. 16, 2011 to Non-Final Office Action mailed Aug. 1, 2011 from U.S. Appl. No. 12/391,188, 11 pages.
Final Office Action mailed Dec. 19, 2011 from U.S. Appl. No. 12/391,188, 17 pages.
Response filed Mar. 19, 2012 to Final Office Action mailed Dec. 19, 2011 from U.S. Appl. No. 12/391,188, 11 pages.
Notice of Allowance mailed Apr. 2, 2012 from U.S. Appl. No. 12/391,188, 5 pages.
CN Notice on the First Office Action mailed Jul. 29, 2013 for Application No. 201080009556.7, 11 pages.
Response filed Dec. 9, 2013 to First Office Action mailed Jul. 29,2013 for Chinese Application No. 2010800095561, 15 pages.
EP Communication for Application No. 10744134.7, Nov. 13, 2012, 6 pages.
EP Communication for Application No. 10744134.7, Dec. 3, 2012, 1 page.
Response filed Jan. 30, 2013 to Official Communication for EP Application No. 10744134.7.
Non-Final Office Action mailed Dec. 3, 2013, from U.S. Appl. No. 12/781,445, 16 pages.
Response filed Apr. 1, 2014 to Non-Final Office Action mailed Dec. 3, 2013, from U.S. Appl. No. 12/781,445, 12 pages.

(56) References Cited

OTHER PUBLICATIONS

Final Office Action mailed May 5, 2014, from U.S. Appl. No. 12/781,445, 12 pages.
Response filed Sep. 15, 2014 to Final Office Action mailed May 5, 2014, from U.S. Appl. No. 12/781,445, 10 pages.
Notice of Allowance mailed Mar. 31, 2014, from U.S. Appl. No. 12/492,385, 5 pages.
Supplemental Amendment filed Jun. 6, 2014, from U.S. Appl. No. 12/492,385, 8 pages.
Notice of Allowance mailed Jun. 24, 2014, from U.S. Appl. No. 12/492,385, 8 pages.
Notice of Allowance mailed Jul. 30, 2014, from U.S. Appl. No. 12/492,385, 7 pages.
Final Office Action mailed Feb. 5, 2014, from U.S. Appl. No. 12/903,227, 18 pages.
Response filed Feb. 10, 2014 to Final Office Action mailed Oct. 9, 2013 from U.S. Appl. No. 13/169,890, 17 pages.
Non-Final Office Action mailed Mar. 27, 2014 from U.S. Appl. No. 13/169,890, 13 pages.
Response filed Jul. 24, 2014 to Non-Final Office Action mailed Mar. 27, 2014 from U.S. Appl. No. 13/169,890, 18 pages.
Non-Final Office Action mailed Nov. 14, 2014 from U.S. Appl. No. 13/169,890, 13 pages.
Final Office Action mailed Jun. 5, 2015 from U.S. Appl. No. 13/169,890, 16 pages.
Notice on Grant mailed Apr. 13, 2015 from Chinese Patent Application No. 201080009556.7, 7 pages.
Notice of Allowance mailed Apr. 9, 2014 from U.S. Appl. No. 12/951,977, 12 pages.
Notice of Allowance mailed May 21, 2014 from U.S. Appl. No. 12/951,977, 9 pages.
Notice of Allowance mailed Sep. 5, 2014 from U.S. Appl. No. 12/951,977, 7 pages.
Notice of Allowance mailed Jul. 7, 2014 from U.S. Appl. No. 12/913,763, 6 pages.
Notice of Allowance mailed Aug. 15, 2014 from U.S. Appl. No. 12/913,763, 6 pages.
Amendment filed Jan. 30, 2013 from Chinese Patent Application No. 2011-551110, 7 pages.
Argument/Amendment filed Oct. 2, 2013 from Chinese Patent Application No. 2011-551110, 11 pages.
Request for Examination and Voluntary Amendment filed Dec. 30, 2014 from Korean Patent Application No. 10-2011-7019493, 17 pages.
Final Office Action, mailed Dec. 18, 2013. from U.S. Appl. No. 13/169,923, 11 pages.
Response filed Feb. 24, 2014 to Final Office Action, mailed Dec. 18, 2013. from U.S. Appl. No. 13/169,923, 18 pages.
Non-Final Office Action, mailed Oct. 6, 2014, from U.S. Appl. No. 13/169,923, 17 pages.
Final Office Action mailed May 14, 2015, from U.S. Appl. No. 13/169,923, 17 pages.
Requirement for Restriction/Election mailed Jun. 22, 2012 from U.S. Appl. No. 12/951,977, 6 pages.
Response filed Jul. 23, 2012 to Requirement for Restriction/Election mailed Jun. 22, 2012 from U.S. Appl. No. 12/951,977, 7 pages.
Requirement for Restriction/Election mailed Aug. 2, 2012 from U.S. Appl. No. 12/951,977, 7 pages.
Response filed Aug. 13, 2012 to Requirement for Restriction/Election mailed Aug. 2, 2012 from U.S. Appl. No. 12/951,977, 6 pages.
Non-Final Office Action mailed Sep. 4, 2012 from U.S. Appl. No. 12/951,977, 10 pages.
Response filed Nov. 29, 2012 to Non-Final Office Action mailed Sep. 4, 2012 from U.S. Appl. No. 12/951,977, 12 pages.
Final Office Action mailed Dec. 17, 2012 from U.S. Appl. No. 12/951,977, 19 pages.
Response filed Apr. 17, 2013 to Final Office Action mailed Dec. 17, 2012 from U.S. Appl. No. 12/951,977, 15 pages.
Non-Final Office Action mailed Jun. 21, 2012 from U.S. Appl. No. 12/973,399, 20 pages.
Response filed Aug. 27, 2012 to Non-Final Office Action mailed Jun. 21, 2012 from U.S. Appl. No. 12/973,399, 18 pages.
Final Office Action mailed Oct. 3, 2012 from U.S. Appl. No. 12/973,399, 25 pages.
Response filed Jan. 23, 2013 to Final Office Action mailed Oct. 3, 2012 from U.S. Appl. No. 12/973,399, 16 pages.
Non-Final Office Action mailed Jul. 3, 2014 from U.S. Appl. No. 12/973,399, 26 pages.
Requirement for Restriction/Election mailed Jun. 7, 2012 from U.S. Appl. No. 12/913,763, 10 pages.
Response filed Jun. 27, 2012 to Requirement for Restriction/Election mailed Jun. 7, 2012 from U.S. Appl. No. 12/913,763, 10 pages.
Non-Final Office Action mailed Dec. 31, 2012 from U.S. Appl. No. 12/913,763, 15 pages.
Response filed Apr. 30, 2013 to Non-Final Office Action mailed Dec. 31, 2012 from U.S. Appl. No. 12/913,763, 16 pages.
Notice of Allowance mailed Aug. 23, 2013 from U.S. Appl. No. 12/913,763, 9 pages.
Applicant Initiated Interview Summary mailed Aug. 12, 2015, from U.S. Appl. No. 13/169,923, 3 pages.
Office Action mailed Aug. 10, 2015 from European Patent Application No. 10744134.7-1954, 6 pages.
Bodik et al., "Response-Time Modeling for Resource Allocation and Energy-Informed SLA's," Proc. Workshop on Statistical Learning Techniques for Solving Systems Problems (MS Sys'07), Dec. 8, 2007, identified at <<http://homepages.inf.ed.ac.uk/csutton/publications/sysml.pdf>> on Jul. 27, 2015, 3 pages.
Applicant Initiated Interview Summary mailed Sep. 2, 2015 from U.S. Appl. No. 13/169,890, 3 pages.
After Final Pilot 2.0 Request and Response Filed Oct. 30, 2015 to the Final Office Action Mailed Jun. 5, 2015 From U.S. Appl. No. 13/169,890, 17 pages.

* cited by examiner

| OPTIMAL PARTITION INTERVAL ALGORITHM |
|---|

1. Sort (increasing order) $T_{i,1}, T_{i,2},\ldots,T_{i,m},\ldots,T_{i,Q}$ into
   $T'_{i,1} \leq T'_{i,2} \leq \ldots \leq T'_{i,Q}$ (m $\in [1,|Q|]$)
2. $T'_{i,0} \leftarrow 0$
3. if $T'_{i,Q} < \tau$ then
4.    //location $i$ has sufficient power availability
5.    $d_{i,m} \leftarrow 0 \; \forall m \in [1,|Q|]$
6. else
7.    $m \leftarrow 1$
8.    while $T'_{i,m} \leq \tau$ do
9.      $d_{i,m} \leftarrow T'_{i,m} - T'_{i,m-1}$
10.      $m \leftarrow m + 1$
11.    end while
12.    if $m \leq |Q|$ then
13.      $d_{i,m} \leftarrow \tau - T'_{i,m-1}$
14.    end if
15.    for $x = m + 1$ to $|Q|$ do
16.      $d_{i,x} \leftarrow 0$
17.      $u_{i,q,x} \leftarrow 0 \; \forall q \in [1,|Q|]$
18.    end for
19. end if

*FIG. 6*

DYNAMIC APPLICATION PLACEMENT BASED ON COST AND AVAILABILITY OF ENERGY IN DATACENTERS

BACKGROUND

Energy costs are rising as systems scale up and becoming an increasingly larger fraction of running datacenters, accounting for up to a substantial portion of the total expenditure and amounting to tens of millions of dollars per annum. To reduce these costs, efforts are being made in two different directions to combine traditional grid power (e.g., electric grid) and backup power (e.g., UPS and diesel generators) with renewable energy sources (e.g., solar, wave, tidal, and wind), and to exploit the variation of electricity prices both temporally and geographically (e.g., utility prices can change across different regions and even across the same region, based on diurnal patterns—peak and off-peak periods—or even significantly over a window of 5-15 minutes across the country).

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is an optimization framework that dynamically places application instances across multiple hosting sites (e.g., datacenters) based on the energy cost and availability of energy at these sites, application SLAs (service level agreements), availability of compute elements at hosting sites, and cost of network bandwidth between sites, just to name a few considerations. Existing cloud computing infrastructures can now employ the optimization framework and realize significant economic gains.

The architecture leverages a global network of hosting sites, possibly co-located with renewable and non-renewable energy sources, to dynamically determine the best datacenter (site) suited to place application instances to handle incoming workload at a given point in time, in order to minimize the total cost of running the requisite set of application instances across the hosting sites. Application instances can be moved between datacenters subject to energy availability and dynamic power pricing in a multi-electricity market environment, for example, which can vary hourly in day-ahead markets and in a time span of minutes in realtime markets.

The architecture is a closed-loop control system for dynamic application placement that is integrated with a reliable language runtime mechanism to transparently migrate application instances between datacenters, resulting in cutting the energy costs for operating datacenters. A decision component reasons over the hosting sites data and outputs power optimization decisions associated with the hosting sites. An application placement component automatically relocates application instances between hosting sites based on the power optimization decisions.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an algorithm that computes optimum partition intervals.

DETAILED DESCRIPTION

Figure 1:
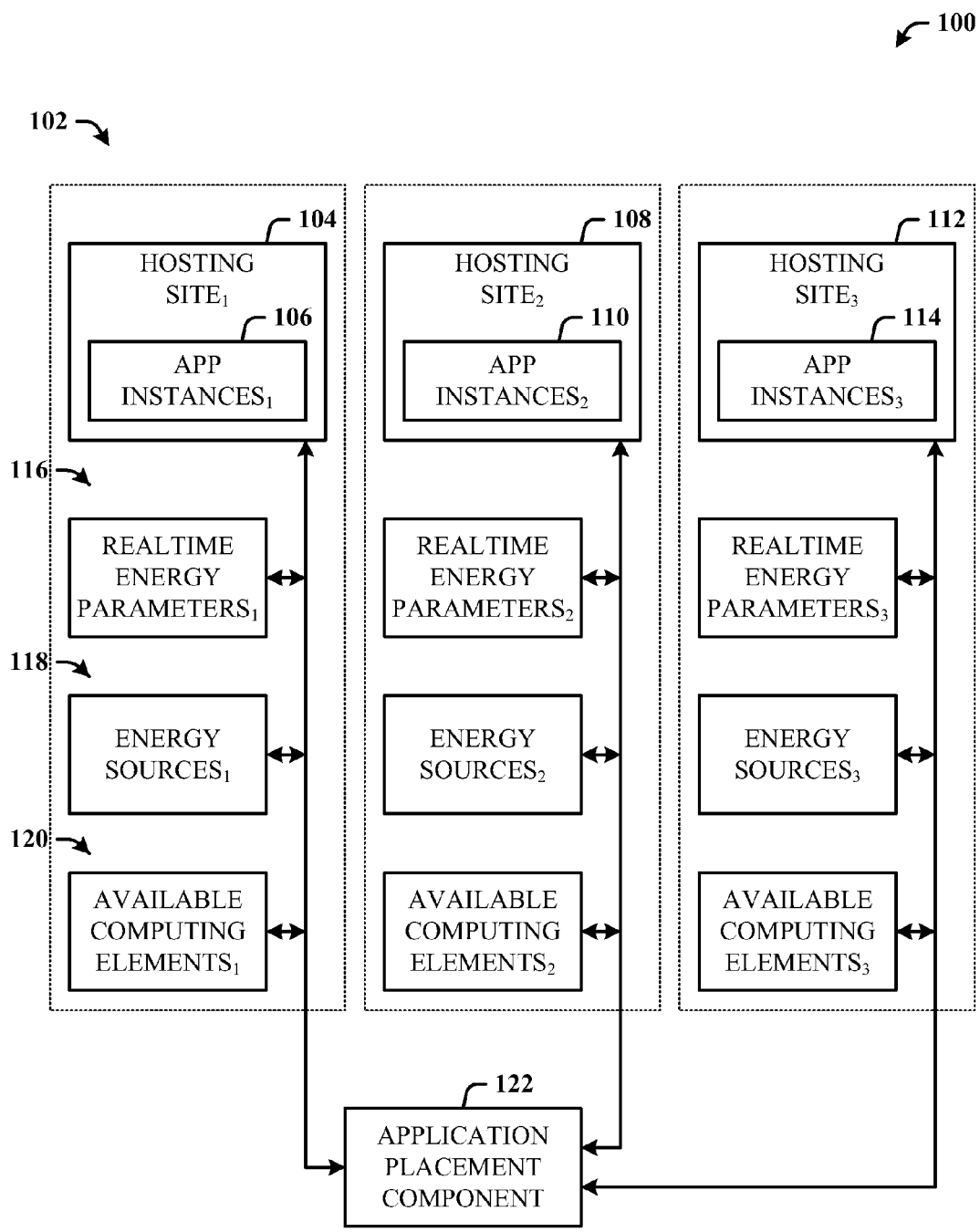
FIG. 1 illustrates an optimization system in accordance with the disclosed architecture.

The disclosed optimization architecture leverages a global network of datacenters (also referred to as hosting sites), possibly co-located with renewable (and non-renewable) energy sources, to dynamically determine the best hosting location (e.g., a computer, a rack, a "colo" (co-location—multiple customer usage of single datacenter), a container, a datacenter, etc.) suited to place (or schedule) application instances at a given point in time. For example, applications may be interactive to handle user requests, or batch applications that process data or perform computations. The optimization framework provides the capability to move application instances between datacenters subject to energy availability and dynamic power pricing, which can vary (a) temporally: hourly in day-ahead markets and in a time span of five minutes in realtime markets, and (b) geographically: pricing variation in different regional markets, even when nearby, and even across locations in the same region. The pricing variation arises due to several factors such as regional demand differences, transmission inefficiencies, and generation diversity. To make decisions on application migration, the framework also takes into account dynamic availability of datacenter equipment due to factors such as power failures or server failures.

The disclosed architecture includes control system for dynamic application placement integrated with a reliable language runtime mechanism (e.g., a programming model for applications implemented as "grains/silos" (stateless, lightweight processes) that enables transparent code mobility) and/or run as an infrastructure service co-located with hosting virtual machines (VMs) to transparently migrate application instances hosted in VMs between datacenters (without impacting the end user), thereby cutting the electric costs for operating datacenters. Measurement tools can be employed to measure the dynamic power footprint of hosted application instances (or hosting VMs).

A general algorithm for dynamic application placement is described as follows: formulate the problem according to the system model described herein, and obtain the current values of the different parameters in the framework (either offline or in an online manner as needed), where realtime monitoring of application QoS (quality of service) and performance counters may also be performed. These values are fed into the optimization framework (which can run on a central controller machine in the datacenter), and solved to compute the optimal placement of application instances across different hosting locations (sites) based on cost and availability of energy as well as the availability of hosting compute elements, among other factors such as bandwidth cost and latency for migrating application instances between sites. These decisions are then actuated to migrate application instances from the current placement to the optimal placement. The optimization problem is solved with a fixed periodicity or on-demand.

The actuation of migrating application instances may also be integrated with request redirection of incoming user requests that can be performed transparently (e.g., via domain name service (DNS) redirection), and replication of application-state and user-data at different hosting sites.

Regarding where the optimization framework is executed, a central facility or a distributed set of machines may monitor execution of applications and hosting site and application instance models, perform software probes, and disseminate and check execution of migration decisions, among other functions.

Note that the algorithm can complement other closed-loop control frameworks for managing pools of resources (e.g., servers) in a datacenter. For example, in one approach, given a large number of servers hosting cloud applications in a datacenter, this approach aims to maximize the energy savings of operating these computers by only running the optimal number of servers needed to process the input workload under given service-level agreement (SLAs), while keeping remaining servers in low-power states (e.g., ACPI (advanced configuration and power interface) performance and sleep states such as sleep, hibernate) or in a shutdown mode to save energy.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates an optimization system 100 in accordance with the disclosed architecture. The system 100 includes multiple hosting sites 102 that run application instances to handle workload. For example, a first hosting site 104 includes first application instances 106, a second hosting site 108 includes second application instances 110, and a third hosting site 112 includes third application instances 114. Each of the hosting sites 102 operate according to realtime energy parameters 116, availability and pricing of energy sources 118, and available computing elements 120. An application placement component 122 automatically relocates application instances between hosting sites based on changes in the energy parameters, the availability of the energy sources, and the availability of the computing elements, among other factors such as cost of application migration.

As described in greater detail herein, the hosting sites 102 are modeled according to one or more of hosting capacity, energy available per source per site at a specific time in terms of watt power intensity and duration, energy cost per source per site at the specific time for each of different available sources of energy, network latency between sites, bandwidth capacity between sites, bandwidth cost per byte between sites, available renewable and non-renewable energy sources, temperature per site, and temperature threshold for each site. One or more of the above data points can be output every configured time interval for consumption by a decision engine (described below).

The application instances (106, 110, and 114) are modeled according to one or more of CPU usage per instance, memory footprint size per instance, number of network connections maintained by an instance, power footprint per instance, SLAs on hosting of application instances, and latency threshold for migrating an instance between two sites.

The availability of an energy source is computed based on at least one of predicted power per site for a specific time, predicted time until which energy is available per site for a specific time, energy per watt-hour cost per site for a specific time, or energy (power) used per site during intervals in a time window, among other factors. The application placement component may relocate application instances based on results of a simulator model. The application placement component 122 makes decisions based on minimizing energy cost and bandwidth cost per migration, meeting service level agreement requirements during the migration or including latency information in computation of cost.

Figure 2:
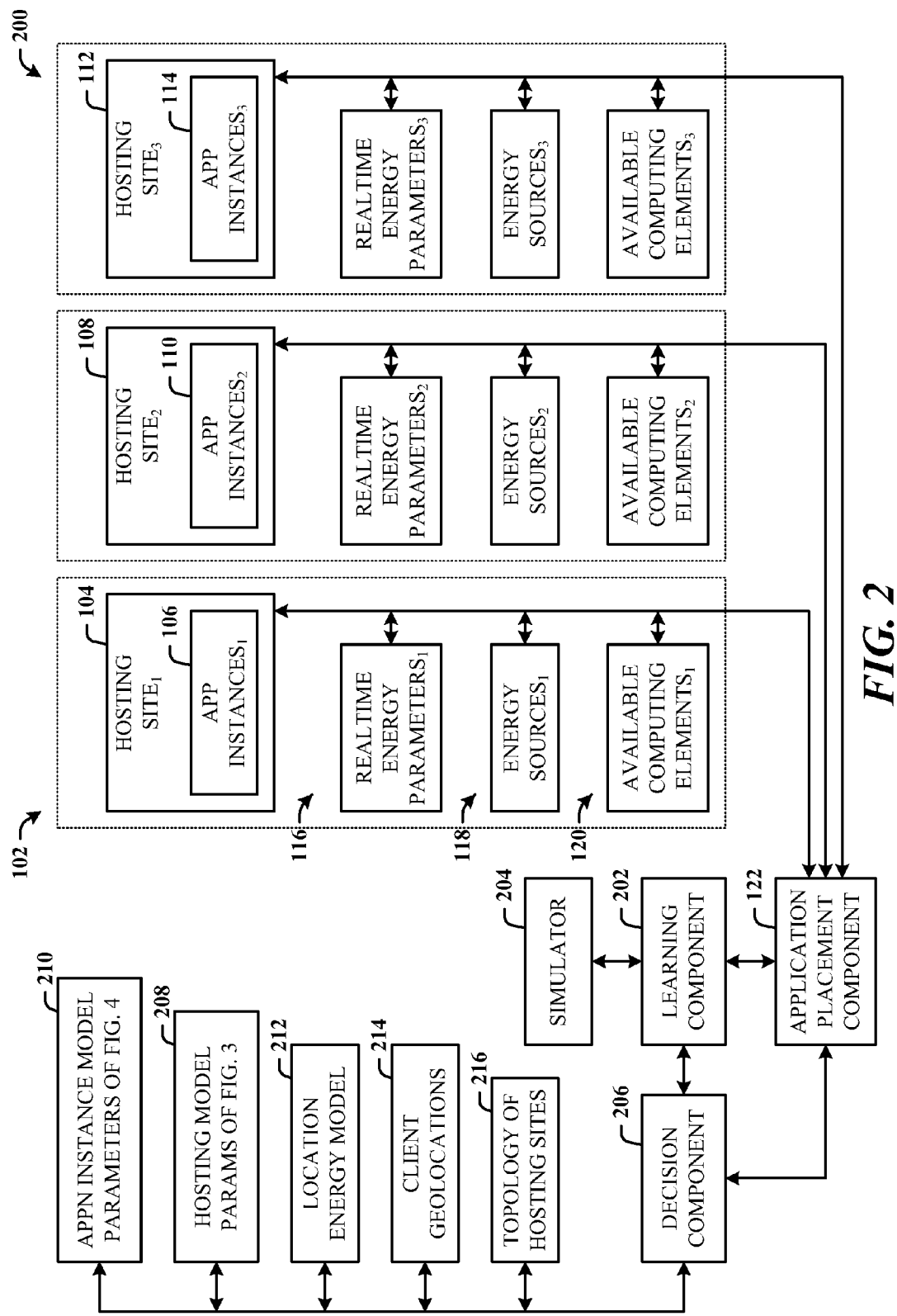
FIG. 2 illustrates an alternative embodiment of a system that includes a learning component that learns about hosting site information, a simulator, and a decision component.

FIG. 2 illustrates an alternative embodiment of a system 200 that includes a learning component 202 that learns about hosting site information, a simulator 204, and a decision component 206. The learning component 202 learns information of the availability of an energy source based on historical energy availability data and future event notifications, for example. The learned information is applied to enhance the prediction power cost and variation in pricing, availability, time until which power is available per site, and at a specific time.

The system 200 includes the multiple hosting sites 102 that run application instances to handle workload. The hosting sites 102 are managed according to data that includes realtime energy parameters, availability of renewable and non-renewable energy sources, and available computing elements. The decision component 206 reasons over the data and outputs power optimization decisions associated with the hosting sites 102. The decision component 206 can receive as inputs the parameters associated with a hosting model 208 (described in FIG. 3) and the parameters associated with an application instance model 210 (described in FIG. 4). The decision component 206 can also receive as inputs a location energy model 212, client geographic location (geolocation) information 214, and topology information of the hosting sites 216. The location energy model 212 estimates power consumption at a location as a function of number of active servers, server utilization, type and number of hosted applications, and infrastructure parameters, among other factors. The application placement component 122 automatically relocates application instances between hosting sites based on the power optimization decisions.

A prediction model can be employed based on electricity grid data as well as weather differentials and climate historical data available from weather services such as NASA (North American Space Administration) and NCAR (National Center for Atmospheric Research) to predict availability of different energy sources such as solar (e.g., intensity, time of day) and wind (e.g., intensity, direction) as used in the framework. The learning component 202 can utilize the data from the prediction model as well as the national agencies to provide additional learning information.

The simulator 204 can be built to use historical data and make predictions on availability of different energy sources. Further, the simulator model itself can be used to install/place generators of renewable energy at different geographic locations that will yield the maximum energy output per monetary cost and take into consideration other factors such as land availability and pricing, taxes, network connectivity, etc.

Put another way, an optimization system 200 is provided that comprises multiple hosting sites that run application instances to handle workload, the hosting sites are managed according to data that includes realtime energy parameters, availability of renewable and non-renewable energy sources, and available computing elements, the decision component that reasons over the data and outputs power optimization decisions associated with the hosting sites, and the application placement component that automatically relocates application instances between hosting sites based on the power optimization decisions.

The decision component reasons over data that includes at least one of hosting capacity, energy available in terms of power intensity and duration and price per site at a specific time, total energy cost per site at the specific time, network latency between sites, bandwidth capacity between sites, bandwidth cost per byte between sites, available renewable and non-renewable energy sources, length of partition intervals at the specific time, availability of hosting compute elements at different sites, temperature per site, or temperature threshold for each site.

The optimization decisions are based on at least one of minimizing monetary costs, minimizing impact on user interactiveness, maximizing longterm availability, maximizing use of renewable resources, minimizing carbon footprint and pollutant emission due to electricity generation and environmental impact, or balancing bandwidth cost and energy cost.

The decision component reasons over the data that includes application instance information related to at least one of CPU usage and memory footprint size per instance, number of network connections maintained by an instance, power footprint per instance, SLAs on hosting of application instances, or latency threshold for migrating an instance between two sites.

The system 200 can further comprise the learning component that learns information of the availability and price of an energy source based on historical energy availability and pricing data and future event notifications, the learned information applied to enhance a prediction time, power intensity, and energy cost until which power is available and its cost per site at a specific time.

Regarding learning component, it may also provide functionality of learning failure patterns of hosting compute elements from historical data and future event notifications so that the learned information can be used in the decision component 206.

Figure 3:
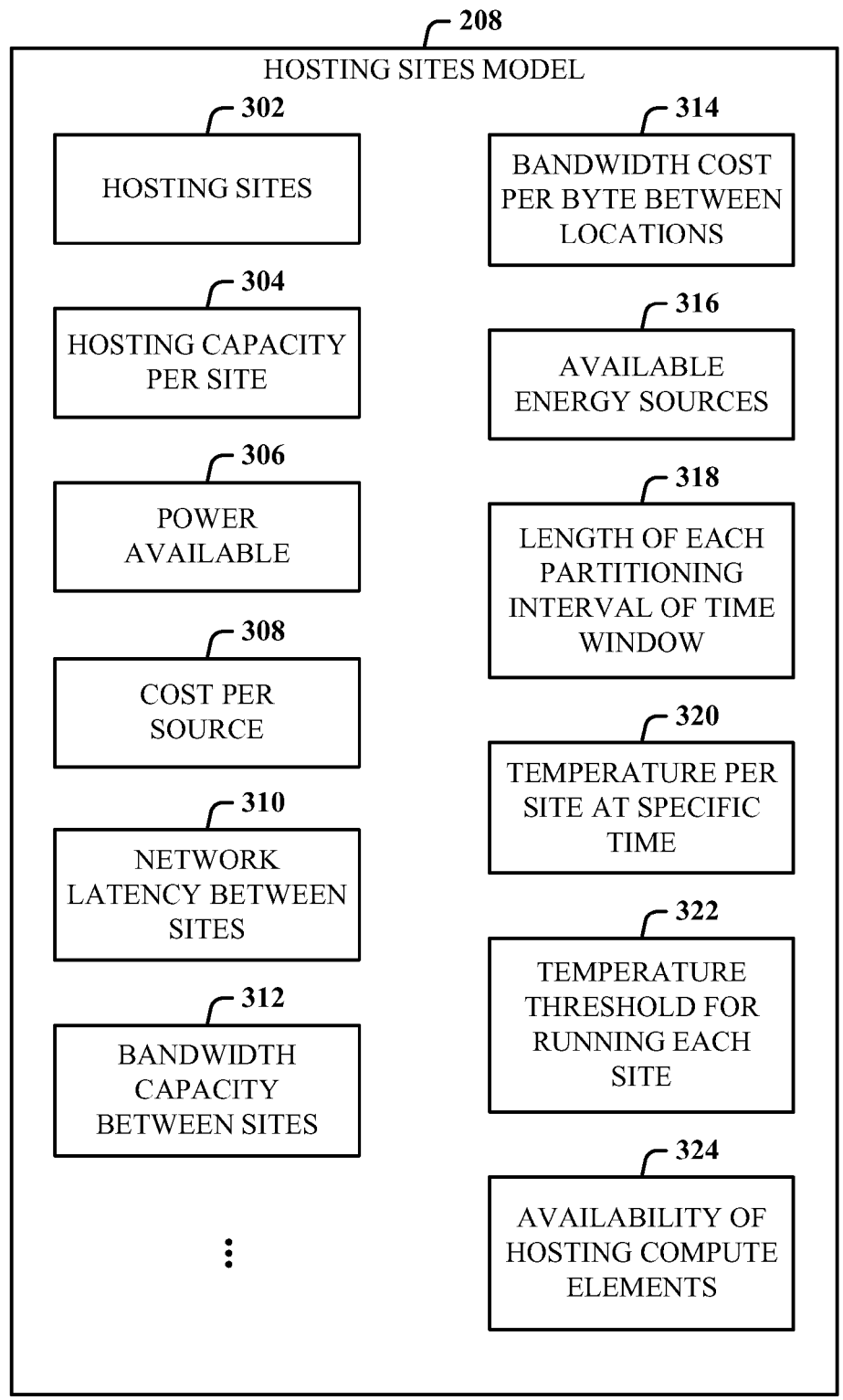
FIG. 3 illustrates a hosting sites model that can be employed for the optimization framework.

FIG. 3 illustrates the hosting sites model 208 that can be employed for the optimization framework. The optimization is run at a time instant t and at a periodicity $\tau$ (e.g., seconds, minutes, or hours). For ease of explanation, the following assumptions on energy availability are made: the fixed power availability (intensity and time duration) and fixed energy cost for each source is known from time instant t to t+$\tau$; and, each energy source is available at time instant t and the energy source availability may expire before time interval $\tau$, but is available at most once from time t to t+$\tau$.

The hosting sites model 208 can include the following:
a model item 302 that denotes the set of hosting locations: 1, ..., N;
a model item 304 that denotes hosting capacity per site: $H_i$(# instances), i$\in$N;
(Note that the hosting capacity of each site can depend on the number of servers available at that site, network constraints such as topology, bisection bandwidth and over-subscription, application constraints such as CPU, memory, I/O footprint of instances (virtual machines (VMs) or grains/silos), business/legal constraints such as a user-centric data can only be hosted in a specific geographic location (e.g., European Union data cannot be hosted in the United States and vice versa), and, failure characteristics of hardware and software, among other factors.)
a model item 306 that denotes power available per energy source, from which derives (computed from variables) energy available per location at time t: $E_i(t)$ (Watt-hour or Watt-second), i$\in$N;
a model item 308 that denotes cost per energy source, from which derives (computed from variables) total energy cost per location at time t: $EC_i(t)$ ($), i$\in$N;
a model item 310 that denotes network latency between locations: $L_{i,k}$ (seconds), i, k$\in$N;
a model item 312 that denotes bandwidth capacity between locations: $B_{i,k}$ (Bps), i, k$\in$N;
a model item 314 that denotes bandwidth cost per byte between locations: $BC_{i,k}$ ($/Byte), i, k$\in$N;
a model item 316 that denotes a set of available energy (renewable and non-renewable) sources: 1, ..., |Q|
(Note that the number of intervals in the $\tau$ window is at most |Q|, but equality can be used by making some interval lengths to zero. The intuition is that an interval boundary is set when an energy source becomes unavailable (end time $T_{i,q}$) in the $\tau$ window. In each such interval, all parameters: power $P_{i,q}$, availability $T_{i,q}$ and power pricing $EC_{i,q}$ are constant. Hence, the number of boundaries would be at most |Q|. Further, this setting helps in computing the length of these intervals a priori. The assumption here is that each power source is available from start time of $\tau$ window and will appear only once in that window.);
For source q$\in$Q, predicted power available per location at time t: $P_{i,q}(t)$ (Watt), i$\in$N;
For source q$\in$Q, predicted time until which power is available per location at time t: $T_{i,q}(t)$, i$\alpha$N (Note that the assumptions here are that the energy source q is available with constant power $P_{i,q}(t)$ at cost $EC_{i,q}(t)$ from t until $T_{i,q}$+t. Assumptions such as fixed power, fixed price, and availability starting time t are removed later.);
For source q$\in$Q, energy cost per Watt-hour per location at time t:
$EC_{i,q}(t)$ ($/Watt-hour), i$\in$N; and
(Variable) For source q$\in$Q, power used per location during each of m intervals in the time window $\tau$: $u_{i,q,m}(t)$ (Watt), i$\in$N, m$\in$1, ... |Q|;
a model item 318 (variable) that denotes the length of each of the m partitioning intervals of the time window $\tau$: $d_{i,m}(t)$ (seconds), m$\in$1, ..., |Q| (the interval $\tau$ is partitioned into |Q| (i.e., number of available energy sources) intervals and in each interval, the decision component 206 uses $u_{i,q,m}(t)$ power from source q at site i; $\Sigma_{m=1}^{|Q|} d_{i,m} = \tau$;

a model item 320 that denotes temperature per site at time t: $\theta_i(t)$ (degrees F or C), $i \in N$;

a model item 322 that denotes a temperature threshold of running each site: $\Theta_i$ (degrees F or C), $i \in N$; and, a model item 324 that denotes availability of hosting compute elements.

Note that the prediction times, $T_{i,q}$, power $P_{i,q}$, and power pricing $EC_{i,q}$ for $q \in Q$, for different energy sources such as solar, tidal, wind, grid, backup, etc., can be learned (in offline and/or online manner) from past history of power availability and future event notifications using the learning component 202. Further, each of these terms are set to be the minimum of corresponding predicted time of itself ($T_{i,q}$) and time interval $\tau$, since the framework looks ahead for the next interval $\tau$ time to minimize the cost function.

The look-ahead may not be done beyond $\tau$ (e.g., to support instance migrations with large data footprint) as most migrations are expected to be for interactive, light-weight instances that can be quickly transferred, whereas instances using large amounts of persistent state can be transferred offline, moved to one of the data replica locations (obviating the need to transfer hard state), be pinned to the original data location, or use an external highly-available, replicated storage service which does not require the transfer of persistent data.

Note that $E_i(t)$ may be fixed over the time interval $\tau$ or it may vary due to dynamic pricing at fine time granularities (e.g., 5-min fluctuations in realtime or spot markets); in the latter case, compute Ei(t) based on weighing energy prices by the time duration the prices remain constant and averaged over the total time interval $\tau$.

The terms for available energy $E_i(t)$ and energy cost $EC_i(t)$ at time t are computed as follows (Note that the product of two variables, $u_{i,q,m}(t) * d_{i,m}(t)$, will make the optimization problem non-linear; one approach is to use a Lagrange multipliers method; however, the problem can be converted back to linear by determining the values of $d_{i,m}(t)$ a priori before solving the optimization problem.):

$$E_i(t) = \Sigma_{m=1}^{|Q|}(\Sigma_{q \in Q} u_{i,q,m}(t)) * d_{i,m}(t) \quad (1)$$

$$EC_i(t) = \Sigma_{m=1}^{|Q|}(\Sigma_{q \in Q} u_{i,q,m}(t) * EC_{i,q}(t)) * d_{i,m}(t) \quad (2)$$

The equations (1) and (2) denote the total energy available and the total energy cost at time t at hosting location i powered by different sources of energy. Note that the availability and pricing of a given energy source may change dramatically over a short period of time.

Figure 4:
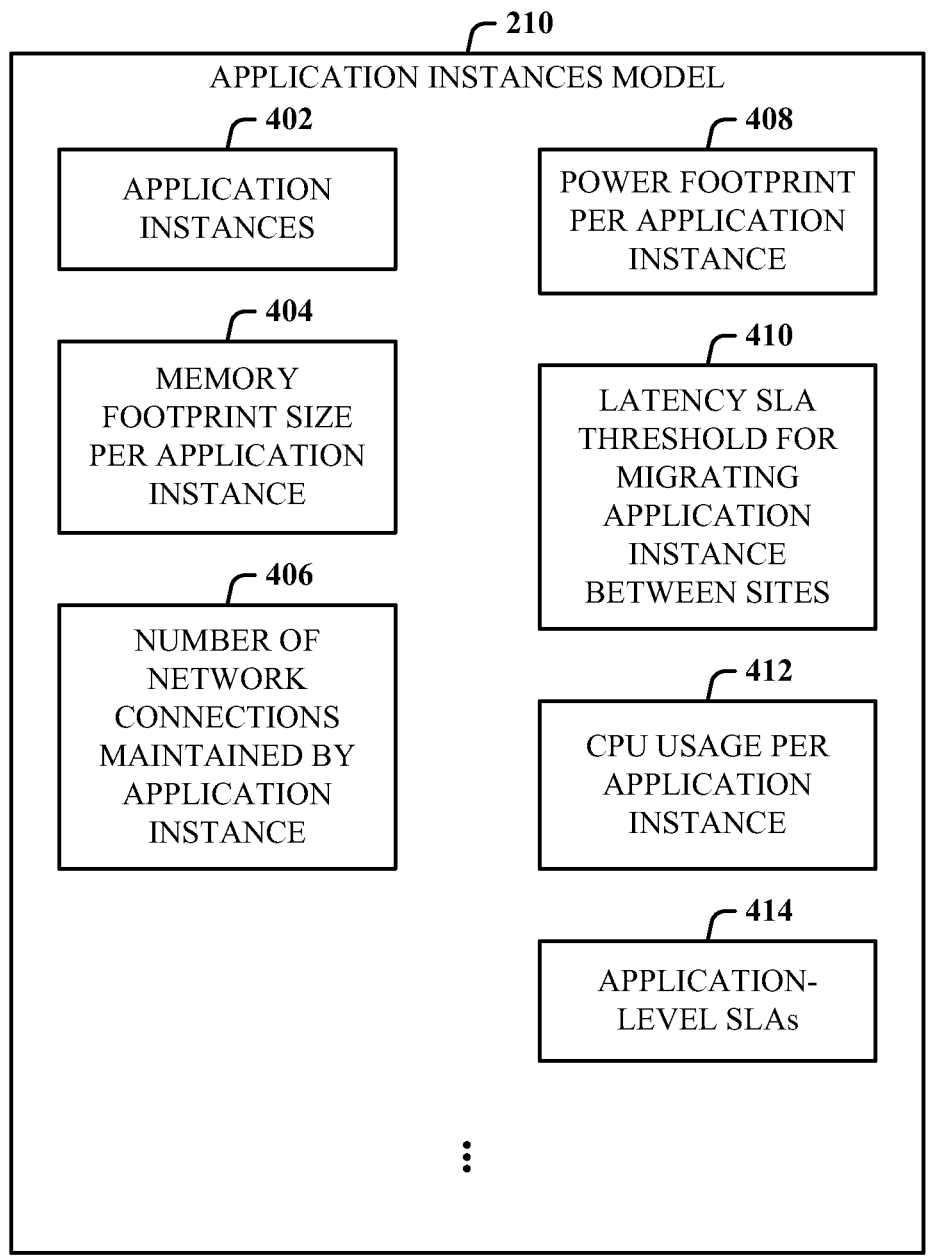
FIG. 4 illustrates an application instances model that can be employed for the optimization framework.

FIG. 4 illustrates the application instances model 210 that can be employed for the optimization framework. The model 210 can be hosted to include the following:

a model item 402 that denotes the set of application instances: 1, . . . , J;

a model item 404 that denotes the memory footprint size per application instance: $s_j$ (Bytes) $\forall j \in J$;

a model item 406 that denotes the number of network connections maintained by application instance: $c_j$ (number) $\forall j \in J$;

a model item 408 that denotes the power footprint (measured using tools such as Joulemeter) per application instance: $p_j$ (Watt) $\forall j \in J$;

a model item 410 that denotes the latency SLA (service level agreement) threshold for migrating an application instance between two locations: $Lat^{SLA}$ (secs);

a model item 412 that denotes the CPU usage per application instance; and a model item 414 that denotes application-level SLAs.

The $s_j$ term primarily includes soft state of an instance loaded in memory. For grains using hard state, either, (1) migrated grains (e.g., for interactive applications) will use an external replicated persistent store, (2) a replicated instance is brought on-line (by recreating state if needed) on the new location and then the original instance is shutdown, or (3) grains (e.g., MapReduce jobs) can be pinned to host locations storing hard state in order to leverage data locality. The $s_j$ and $p_j$ costs can be measured offline using profiling or learned in an online manner during the application execution; profiling may include both peak and average loads.

The objective function is to minimize the total energy bill for running application instances as well as the bandwidth and latency costs incurred in migrating the instances. The "knobs" available for this optimization are placement of application instances on different hosting locations. Note that some instances may be pinned to only execute at a particular location, for example, user data and application placement based on legal regulations in Europe or Asia, compatibility of hosting platform (e.g., operating system, VM environment) with applications, application priority, etc. This constraint can be modeled as setting constraints $\lambda_{i,j}=0$ (described below) for all i locations, where instance j cannot run.

Application placement (the pinning of application instances or operators to locations) can be encoded using a set of indicator variables $\lambda_{i,j} \in \{0,1\} \; \forall i \in N, \forall j \in J$, i.e., $$\lambda_{i,j} = \begin{cases} 1, & \text{if } j \text{ is assigned/pinned to location } i \\ 0, & \text{otherwise} \end{cases} \quad (3)$$

Similarly, define $u_{i,j}$ to denote initial placement of application instances.

$$u_{i,j} = \begin{cases} 1, & \text{if } j \text{ is currently assigned/pinned to location } i \\ 0, & \text{otherwise} \end{cases}$$

The solution of the problem computes the values of $\lambda_{i,j}$ and $u_{i,q,m}(t)$, which in turn determine the migration (i.e., current placement $u_{i,j} \neq$ optimal placement $\lambda_{i,j}$) and decisions to shutdown servers (e.g., when $E_i(t)$ is below a threshold, or site i has zero instances running).

Application Instance Constraint. An application instance (running replicated instances is equivalent to naming the instances uniquely as individual instances) is constrained to only run at a single location across all hosting sites, $$\forall j \in J: \Sigma_{i \in N} \lambda_{i,j} = 1 \quad (4)$$

Hosting Capacity Constraint. Similarly, the number of instances that can be hosted at a single site is constrained to the site capacity, $$\forall i \in N: \Sigma_{j \in J} \lambda_{i,j} \leq H_i \quad (5)$$

Note that the hosting term can include multiple factors such as load balancing, power provisioning, physical location, proximity to users, etc. (In the general case, CPU, memory, I/O (e.g., disk, network) footprint of each instance can be included in the hosting capacity constraint, $$\forall i \in N: \Sigma_{j \in J} \lambda_{i,j} * \text{footprint}(cpu_j, mem_j, I/O_j) \leq H_i$$

where $H_i$ can be a resource vector comprising CPU, memory, and I/O dimensions considered individually to satisfy the capacity constraint in each dimension or as an aggregate.

Business/Legal Data Constraint. Business/legal constraints can dictate that data and applications accessing the data corresponding to users in one location cannot be placed in other geographic locations. This constraint can be modeled by setting the indicator variables for all instances j that cannot be located at locations i, to zero, $$\forall i \in N, \forall j \in J \text{ that cannot be hosted at loc } i: \lambda_{i,j}=0$$

Energy Capacity Constraint. Next, model the energy constraint of hosting application instances at a site (demand equals supply), $$\forall i \in N: \Sigma_{j \in J} \lambda_{i,j} * p_j * \tau = E_i(t) \quad (7)$$

Migration Latency Constraint. Similarly, the latency constraint on migrating (migration is feasible if below the SLA latency threshold) an application instance can be modeled as:

$$\forall j \in J, \forall i \in N, \forall k \in N, i \neq k: \mu_{i,j} * \lambda_{k,j} * f(s_j, c_j, i, k) \leq Lat^{SLA} \quad (8)$$

The term $(u_{i,j} * \lambda_{k,j})$ evaluates to one when instance j is moved from location i to k incurring the bandwidth and latency migration cost, and to zero, otherwise. The function $f$ to compute migration latency is described in terms of the amount of state to be migrated (memory footprint size of the instance), the number of network connections that need to be re-established on migration, and a fixed constant overhead. A simple linear function suffices, $$f(s_j, c_j, i, k) = \eta_1 * c_j + \eta_2 * \frac{s_j}{B_{i,k}} + \eta_3 \quad (9)$$

where $\eta_1$ is a constant to denote time latency per connection re-establishment, $\eta_2$ is a multiplicative constant to denote overhead time for network communication, and $\eta_3$ is a fixed constant overhead of network migration of an application instance.

Note that the term $s_j/B_{i,k}$ is a first-order approximates latency which may increase if the network becomes congested due to many migrations or if the bandwidth capacity gets reduced. However, this term is a good approximation for two reasons. First, the inter-DC (datacenter) bandwidths are roughly of the order of 400+ Mbps, whereas live objects/applications are expected to be tens to hundreds of KBs. Thus, several thousands of objects can be migrated at any time. Further, the inter-DC bandwidth capacities are massively over-provisioned compared to the current usage. Second, the objective function includes a bandwidth term as a weighted cost to be minimized where the weight is based on amortized costs/cost-benefit analysis (e.g., pay bandwidth cost of migration if the new location can yield 10× power savings). Hence, it is expected that there will not be too many migrations unless power prices fluctuate significantly.

Note also that setting up a new connection may be significantly more expensive (e.g., about 10× CPU/memory resulting in high latency due to initialization overhead and queuing delay) than keeping an existing connection alive.

Inter-component Latency Constraint. Many cloud applications comprise multiple components that require communication with each other, for example, in a multi-tier web service, a user request is first routed to a front-end load balancer, then to a mid-tier application server and finally to a back-end database server. Therefore, component migration may increase inter-component delay resulting in increased user-perceived latencies. To reduce the impact, component migration is allowed, as feasible, if the inter-component delay is within a latency threshold $\xi$:

$$\forall j \in J, \forall i \in N, \forall k \in N, i \neq k: \mu_{i,j} * \lambda_{k,j} * L_{i,k} \leq \xi \quad (10)$$

The latency threshold $\xi$ may be modeled more precisely, for example, for application instances that require low-latency communications, the constraint can be modeled as follows (however, this constraint makes the problem non-linear):

$$\forall j,j' \in \{\text{app-communication-pairs}\}: \lambda_{i,j} \lambda_{k,j'} L_{i,k} \leq \xi$$

Business Competitiveness Constraint. In some cases, two companies C1, C2 competing with each other to provide similar set of cloud services may have a placement constraint of being hosted in a different physical location than any of their competitors. The intuition is that even if a datacenter location is unavailable, then the competitor service hosted in a different location will still be able to serve customers and generate revenue. This constraint can be modeled as:

$$\forall i \in N, \forall j \in C1, \forall j' \in C2: \lambda_{i,j} \neq \lambda_{i,j'} \quad (11)$$

Hosting Site Temperature Constraint. The temperature constraint of running each datacenter location checks that if a hosting location is running at least one application instance, then its current temperature should be below its temperature threshold. This constraint can be modeled as follows:

$$\forall i \in N, \forall j \in J: \theta_i(t) * \lambda_{i,j} \leq \Theta_i \quad (12)$$

Bandwidth Cost. The bandwidth cost (in $) of migrating application instances (e.g., from location i to k) is modeled as:

$$BwCost = \sum_{i \in N} \sum_{k \in N, i \neq k} BC_{i,k} * \left( \sum_{j \in J} \mu_{i,j} * \lambda_{k,j} * s_j \right) \quad (13)$$

Note that in order to remove the constraint (i≠k) in the above equation, the intra-datacenter costs $BC_{i,i}$ can be modeled as zero.

Latency Cost. Similarly, the latency cost (in $) of migrating application instances (e.g., from location i to k) can be modeled as the following:

$$LatCost = \sum_{i \in N} \sum_{k \in N, i \neq k} \sum_{j \in J} \mu_{i,j} \lambda_{k,j} Z(s_j, c_j, i, k) \quad (14)$$

Note that the latency can be modeled as a cost function to be minimized as below (e.g., datacenter and application operators may be willing to pay SLA penalties at times to save on operational costs) or as a constraint to be satisfied as in the alternative problem formulation described below.

The cost function Z to convert latency to a $ cost can be described in terms of SLA violation during application migration. A simple cost function can be defined as follows:

$$Z(s_j, c_j, i, k) = \begin{cases} 0 & \text{if } f(s_j, c_j, i, k) \leq Lat^{SLA} \\ \rho & \text{if } (Lat^{SLA} < f(s_j, c_j, i, k) \\ & \wedge \ f(s_j, c_j, i, k) \leq 3 * Lat^{SLA}) \\ \infty & \text{otherwise} \end{cases} \quad (15)$$

where $\rho$ is a fixed value or a dynamic value (e.g., proportional to overshoot of $Lat^{SLA}$) denoting the SLA violation penalty.

Energy Cost. The energy cost of running all application instances across the hosting locations can be modeled as:

$$EnergyCost = \sum_{i \in N} EC_i(t) = \sum_{i \in N} \left( \sum_{m=1}^{|Q|} \left( \sum_{q \in Q} u_{i,q,m}(t) * EC_{i,q}(t) \right) * d_{i,m}(t) \right) \quad (16)$$

Finally, the energy, bandwidth, and latency costs can be combined into a single cost metric.

$$Cost(\$) = \alpha EnergyCost + \beta BwCost + \delta LatCost \quad (17)$$

Note that the weights $\alpha$, $\beta$, $\gamma \in [0, 1]$ are assigned to give relative importance to each cost component; for normalization $\alpha+\beta+\gamma=1$.

Constraint on Variable Values. The constraints on power used per source q ($u_{i,q,m}(t)$), and length of partitioning intervals ($d_{i,m}$) variables can be modeled as follows:

$$\forall m \in [1, |Q|] : d_{i,m}(t) \leq \tau \quad (18)$$

$$\sum_{m=1}^{|Q|} d_{i,m} = \tau$$

$$\forall i \in N, \forall q \in [1, |Q|], \forall m \in [1, |Q|] : u_{i,q,m}(t) \leq P_{i,q}(t)$$

$$\forall i \in N, \forall m \in [1, |Q|] : \sum_{q \in Q} u_{i,q,m}(t) = \sum_{j \in J} \lambda_{i,j} * p_j$$

$$\forall i \in N : \sum_{q \in Q} \sum_{m=1}^{|Q|} u_{i,q,m}(t) * d_{i,m}(t) = \sum_{j \in J} \lambda_{i,j} * p_j * \tau$$

Note that supply≥demand constraints are satisfied on both energy and power at each time instant. In particular, for power, since the power availability does not change between any partition interval, it suffices to check at the boundaries, $$\forall i \in N, \forall m \in [1, |Q|] : \Sigma_{q \in Q} u_{i,q,m}(t) = \Sigma_{j \in J} \lambda_{i,j} * p_j$$

Using these formulations, the objective function can be defined as a constrained Mixed Integer Linear Programming (MILP) of minimizing the total cost of running application instances across hosting datacenters.

Objective: MIN Cost($) (19)

subject to the constraints (3), (4), (5), (6), (7), (10), (11), (12), (18) which is solved using a standard ILP (integer linear programming) solver on the above formulation.

Computing $d_{i,m}(t)$: To make the optimization problem linear, the optimal setting of the length of partitioning intervals can be pre-computed: $d_{i,m}(t)$; t is omitted from representation unless otherwise specified.

The intuition is at each hosting site i, to first sort into a list the end times $T_{i,q}$, until which power from source q is available, $$T_{i,1}' \leq T_{i,2}' \leq \ldots \leq T_{i,Q}' (m \in [1, |Q|])$$

Figure 5:
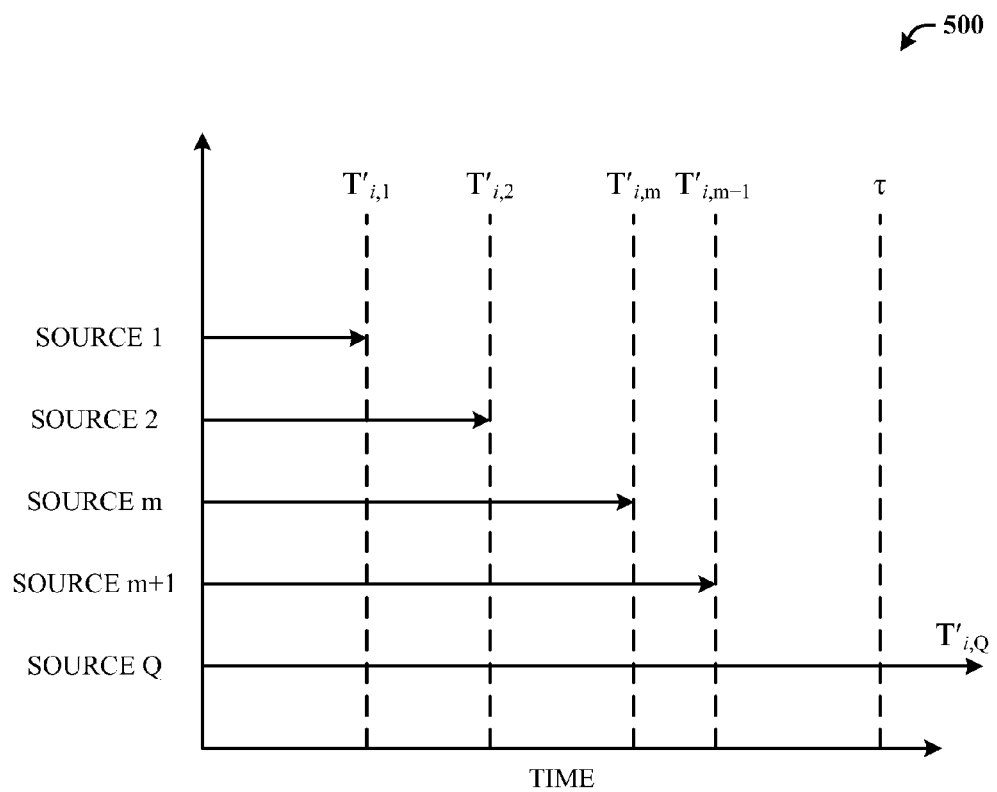
FIG. 5 illustrates a sorted sequence of power sources based on end time of source power availability.

Next, split the time window (interval) $\tau$ into $|Q|$ partition intervals with the boundaries set by the $T'_{i,q}$. FIG. 5 illustrates a sorted sequence of power sources based on end time of source power availability. Note that all fluctuations of power availability only occur at the boundaries of these intervals. Then, set the lengths of these intervals based on the boundaries. FIG. 6 illustrates an algorithm that computes optimum partition intervals.

Alternative Problem Formulation. A related variant of the problem is to minimize the total cost of running all application instances across hosting datacenters subject to service level agreement (SLA) as the upper bound on migration latency of an instance between two hosting locations (e.g., the upper bound on migration latency $Lat^{SLA}$ is at most 500 ms), Objective: MIN Cost($)=$\alpha$EnergyCost+$\beta$BwCost (20)

subject to the constraints (3), (4), (5), (6), (7), (10), (11), (12), (18) and the latency constraint (8) that migrating an application instance is feasible if it is below an SLA threshold, $$\forall j \in J, i \in N, k \in N, i \neq k: \mu_{i,j} * \lambda_{k,j} * f(s_j, c_j, i, k) \leq Lat^{SLA} \quad (21)$$

which is solved using a standard ILP solver on the above formulation.

Following is an example implementation.

Input/Output: The inputs employed are defined in the system model for both hosting locations and application instances. The output is values of $\lambda_{i,j}, \lambda_i \in N$, $j \in J$ denoting optimal placement of application instances across locations, and $u_{i,q,m} \forall i \in N$, $j \in J$, $q \in Q$, $m \in [1, |Q|]$ denoting the optimal power usage from each energy source during each of the $|Q|$ partition intervals. These decisions are translated into migration and shutdown servers as previously described.

Initial Placement: The current placement of instances can be initialized to locations before running the optimization framework, that is, set $u_{i,j}$, $\forall i \in N$, $j \in J$.

The periodic time interval $\tau$ for running the controller (application management component 122) can be set such that (1) the system has sufficient time (not too short) to transition from one stable state to another (all migration of instances and state transitions are completed before again optimizing the placement) and (2) the cost function has not significantly changed (not too long) that most placement decisions soon become suboptimal. Ideally, interval $\tau$ can be set so that dynamic power pricing only incurs a modest cost increase over the optimal cost, before running the controller again.

Dynamic Power Fluctuation. Since the power availability of any energy source, such as grid and solar, may change dramatically over a short period of time, the algorithm recalculates the energy terms for the affected locations and if the energy available is insufficient (violates equation (7) to run instances hosted at that location until the next time to run the optimization controller), either the global optimization can be run at that time for all the datacenter locations, or simply the requisite number of instances moved from the affected locations to under-utilized locations while meeting the constraints on hosting capacity, temperature, and available energy at the new locations as well as the affected locations (until energy needed falls below available capacity).

Dynamic Temperature Fluctuation. Similarly, if the temperature at a hosting site risks (or as predicted) overshooting its threshold, the algorithm can follow the above procedure by either proactively re-running the global optimization, or migrating instances from affected locations to other locations while meeting the constraints on hosting capacity, temperature, and available energy at the new locations.

Dynamic Power Pricing Fluctuation. In case the energy prices vary significantly over a short period of time, the global optimization can be re-run or the affected locations ranked by decreasing cost of available energy and migrate instances in the following manner: from locations with highest energy cost to locations with least energy cost, while meeting the constraints on hosting capacity, temperature, and available energy at the new locations.

Bandwidth cost versus energy cost savings. To balance the trade-off between bandwidth cost and energy savings, a cost-benefit approach can be employed where an instance is only migrated when its bandwidth cost can be amortized over n execution periods of savings in the energy cost. The weighing constants $\alpha$, $\beta$ can be set accordingly.

Integrating caching with application execution. To maximize availability under limited capacity, application architects and cloud operators may integrate caching with application execution by running a small number of cache servers at places with expensive power, and (relatively) large number of application servers at locations with cheap power.

Speculative prefetching of bulk data or background replication. To support dynamic application migration, persistent user data and application state may be speculatively transferred to potential hosting locations as a background service.

Minimizing impact on user interactiveness. To reduce the impact of user-perceived latency due to multiple migrations of the interacting application, a count of the number of times an instance has been migrated may be maintained and input as a constraint to limit migrations of instances to below that threshold in a given time period.

Following is a description of extensions to the disclosed optimization architecture that can be employed.

Figure 7:
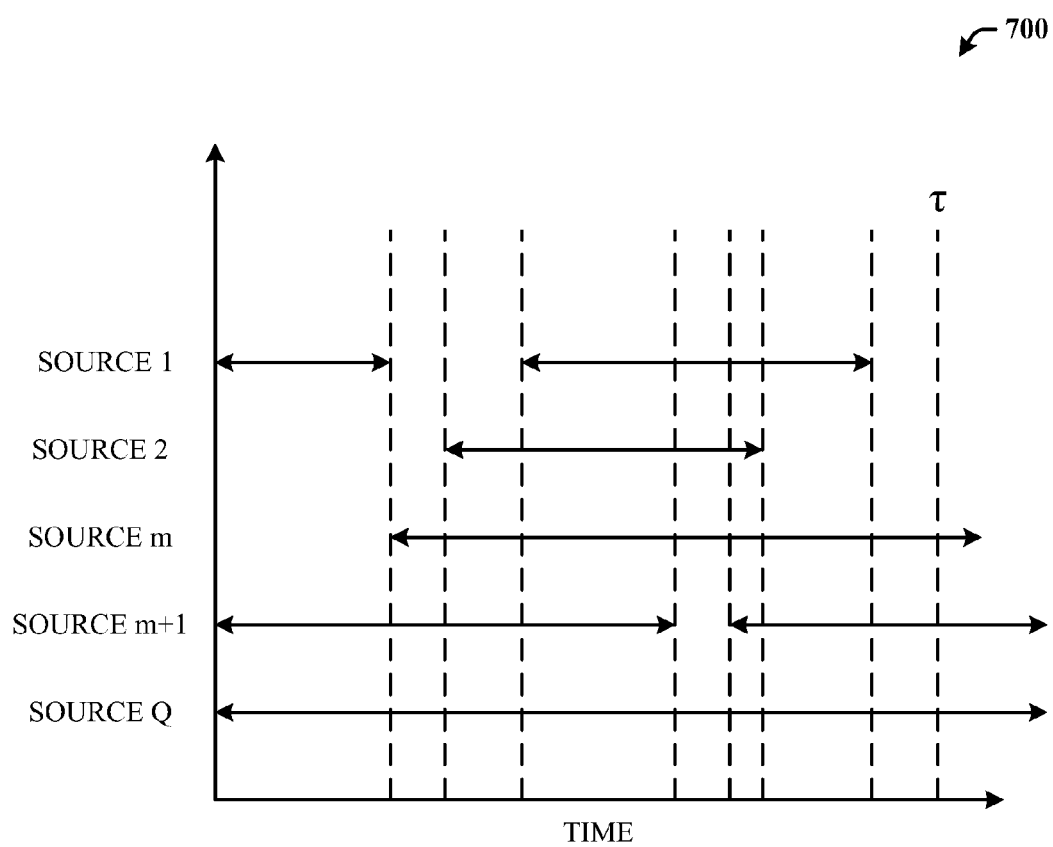
FIG. 7 illustrates that each power source may have different start and end times of availability for power pricing.

Relaxing the assumptions. The assumptions, fixed power and fixed price during time window $\tau$, and power availability from each source starting time t, can be relaxed. FIG. 7 illustrates that each power source may have different start and end times of availability for power pricing. Partitioning of the time window $\tau$ can be based on start time and end time of power availability. It is between these times during which the associated power pricing remains fixed and power from a source may be available (non-continuous) over different time intervals during time window $\tau$.

In this model, a power source is represented as a four tuple: (start time, end time, watt power intensity, and price). Availability of a single power source during different time intervals can be treated as different (virtual) power sources. Then, partition the time period $\tau$ by marking boundaries at start and end times for each virtual power source, based on time instance when the value of watt power intensity of an energy source gets changed, based on time instance when the cost of watt power intensity of an energy source gets changed, and then compute the length of partitioning intervals as done previously.

Look ahead to multiple time steps. The look ahead for the optimization can be extended from a single step to multiple (say l) look-ahead steps by increasing the interval $\tau$. Note that the dynamic pricing and availability of energy is already accounted in the formulation of a single look-ahead step.

Reducing impact on user latency. Dynamic application placement to distant geographic locations may result in increased user-perceived latency or turn-around time of batch jobs. One approach is to input a constraint that application migration may only be allowed to a subset of locations (e.g., based on geographic zone or availability zone) so that the impact on user latency is small. Another solution is to incorporate latency constraints between user and applications, and between application components (e.g., grains) in the optimization framework.

Dynamic bandwidth pricing. Dynamic pricing of wide-area network bandwidth cost can also be included in the optimization framework.

Delay-tolerant job execution. For background services such as web crawl jobs, or applications that can tolerate delayed execution (e.g., temporarily suspended and resumed at a later time) the jobs can be scheduled (start time, end time, resume time) to run when operating costs are minimum (e.g., low demand time periods such as evenings across different time zones) or executing at a limited/reduced scale at different times to reduce operating costs.

Regarding delay-tolerant execution, an alternative embodiment is to include dynamic pricing of running application instances when customers have flexibility in when the associated applications can run, for example, in cloud hosting services. A benefit of dynamic pricing is that large pools of resources can be made available to applications when needed.

Fine-grained allocation model. To support fine-grained resource allocation in utility computing infrastructures (e.g., allow users to allocate standard, high memory, or high CPU instances, or small, medium (2× CPU), large (4× CPU), and extra-large (8× CPU)), the hosting capacity $H_i$ of location i can be specified in these units and constraints added on instances hosted on a given resource granularity can only be migrated to the same resource granularity (or higher) at a different location with spare capacity.

Figure 8:
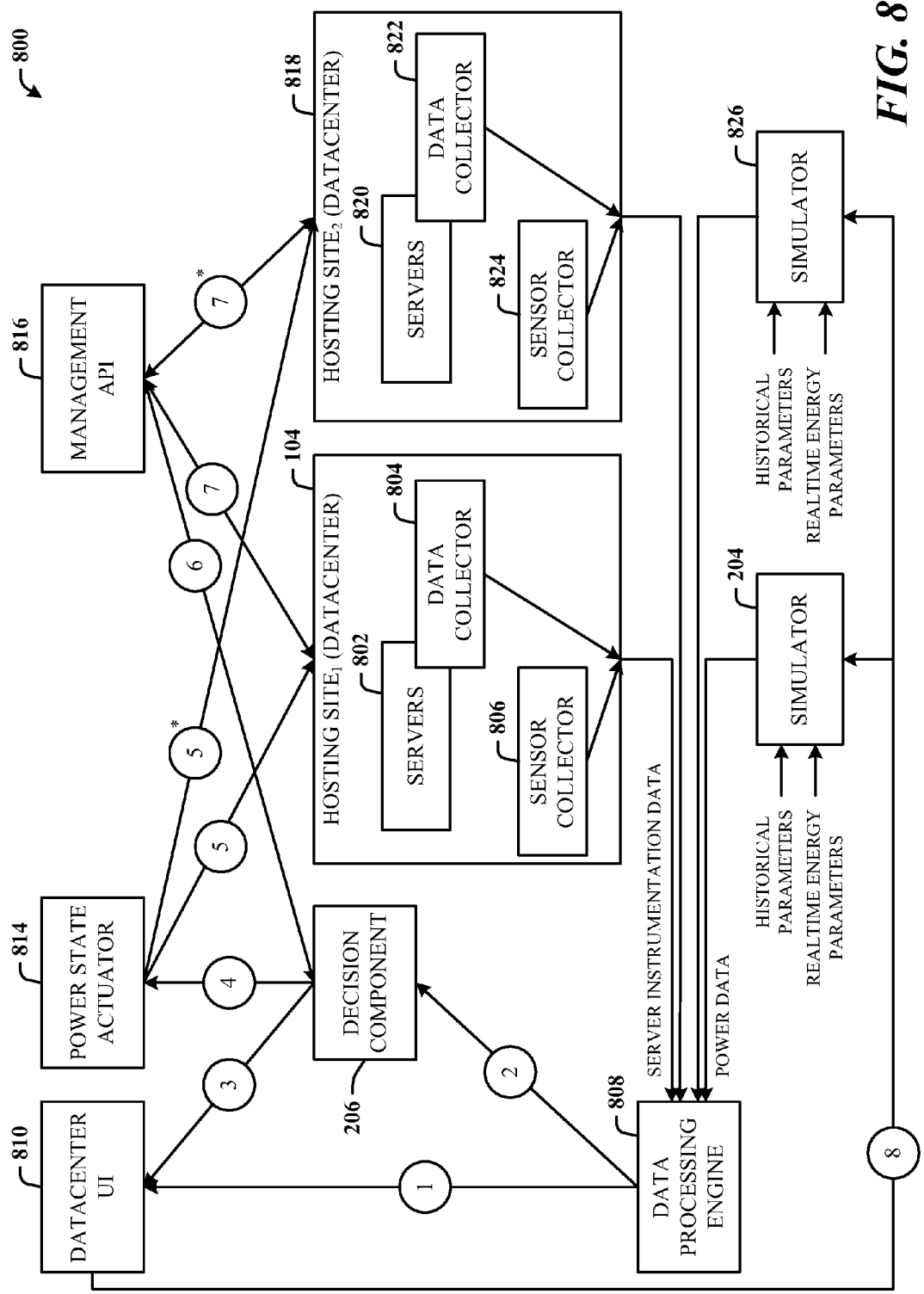
FIG. 8 illustrates an intelligent power control system for the hosting site.

FIG. 8 illustrates an intelligent power control system 800 for hosting sites. The hosting site 104 includes servers 802 (as computing elements), a data collector 804 that collects data related to the servers 802, and a sensor collector 806 that reads hosting site parameters such as temperature, power consumption, and so on. The output of the data collector 804 and sensor collector 806 is passed as server instrumentation data to a data processing engine 808.

The functionality described herein and associated with the hosting site 104 also applies to a second hosting site 818, that includes servers 820 (as computing elements), a data collector 822 that collects data related to the servers 820, and a sensor collector 824 that reads hosting site parameters such as temperature, power consumption, and so on. The output of the data collector 822 and sensor collector 824 is passed as server instrumentation data to the data processing engine 808. The second hosting site 818 has an associated simulator 826 that performs similarly to the simulator 204.

The data processing engine 808 sends raw data along ① to a datacenter UI 810 for use viewing and interaction. The data processing engine 808 also sends data event notifications along ② to the decision component 206 (a decision engine).

The decision component 206 sends decision output along ③ to the datacenter UI 810 for presentation. The decision component 206 also sends power state change decisions and responses along ④ to a power state actuator 814. The power state actuator 814 sends power state change execution along ⑤ to the hosting site 104 and along ⑤ to the second hosting site 818. The decision component 206 also sends VM or application grain (instance) migration decisions and responses along ⑥ to a management API 816. The management API 816 sends grain migration execution along ⑦ to the hosting site 104 and along ⑦* to the second hosting site 818. The datacenter UI 810 interfaces to the simulators (204 and 826) to make adjustments to power variables at the simulators (204 and 826).

The data processing engine 808 receives all the data in the system 800, and then aggregates and correlates the data before passing it to the decision component 206. The data collector 804, the datacenter sensor collector 806 and the simulator (e.g., power and cost) 204 all pass data points to the data processing engine 808. Similarly, the data collector 822, the datacenter sensor collector 824 and the simulator (e.g., power and cost) 826 all pass data points to the data processing engine 808.

The following description details the how the data is passed to the data processing engine 808, what data will be passed and the queries, which will be to aggregate and correlate the data and how the data will be passed to the decision component 206 (an intelligent power controller). The sensor collectors (806 and 824) collect server power data (for each of the servers being used) and total power (for each unit being used).

The decision component 206 is the decision-making entity that takes the data coming from the data processing engine 808, reasons over the data and makes a decision on what each server's power state should be. The decision component 206 contains the following configuration data: base memory usage of the management API runtime, number of active servers, decision interval (in milliseconds), UI update interval (in milliseconds), file location where to hold data shared with UI application, base power consumption of the network of datacenters, the datacenters being controlled, the servers in each datacenter being controlled, communications channel for a directory service, TCP channel information for the power state actuator 814, and the TCP channel information for the datacenter UI 810.

The simulator 204 (and simulator 826) can collect historical parameters and realtime energy parameters (data points), not limited to: power, the available solar power (watt power intensity and duration), used solar power for last time interval (watt power intensity and duration), available grid power (watt power intensity and duration), used grid power for last time interval (watt power intensity and duration), available backup power (watt power intensity and duration), used backup for last time interval (watt power intensity and duration), unit cost, power cost ($/kWh) for different sources, and network bandwidth cost ($/kB) between it and one or more other datacenters, $Lat^{SLA}$, for example. The basic functionality of the simulator 204 (and simulator 826) is to calculate each of the above data points at the configured time intervals and send the data to the data processing engine 808. The simulator 204 (and simulator 826) then sends outputs for every configured time interval for each of the above data points.

The following are respective inputs into the simulators (204 and 826): total power drawn by the datacenter (arrives in regular intervals); weather (a discrete set of weather states such as cloudy, partially cloudy, and not cloudy; time of day (a discrete set of times of day such as dawn, morning, noon, afternoon, dusk, night; grid power availability (the percent of the max grid power that is available at any time interval); pricing historical data and models of different power sources, and input location for weather, time of day and grid power availability. These inputs can come either from a file or over the TCP channel. This method allows for changing between receiving these inputs through the TCP channel versus reading from a simulation file. If there is a change from the file to the TCP channel and then back to the file then the file will pickup exactly as it left off. If a simulation file is not passed in the command line arguments then this command is ignored.

The power state actuator 814 provides the execution engine for the power state decisions on datacenter servers (802 and 820) by the decision component 206. The power state actuator 814 provides the following functionality: takes power state decisions and executes power state changes associated with these decisions; manages any retries necessary to move a node to the correct power state; and, exposes the current power state for servers managed by the power state actuator.

In addition to the power state actuator 814, a lightweight power state agent runs on each managed server that allows the power state actuator 814 to remotely turn off, put to sleep, and to hibernate, a server. The power state actuator 814 also performs verification to ensure the power state of the server(s) being controlled.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
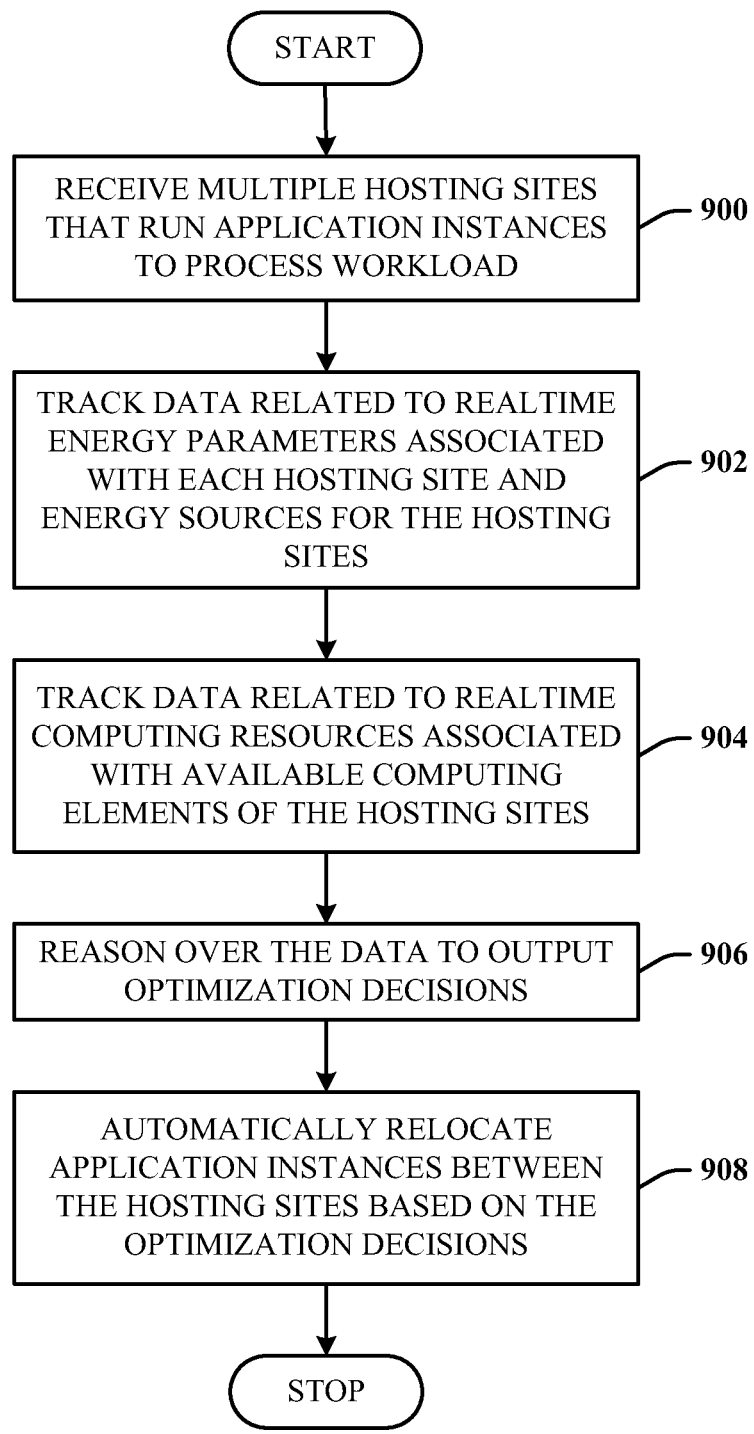
FIG. 9 illustrates a computer-implemented optimization method in accordance with the disclosed architecture.

FIG. 9 illustrates a computer-implemented optimization method in accordance with the disclosed architecture. At 900, multiple hosting sites are received that run application instances to process workload. At 902, data related to realtime energy parameters associated with each hosting site and energy sources for the hosting sites is tracked. At 904, data related to realtime computing resources associated with available computing elements of the hosting sites is tracked. At 906, the data is reasoned over to output optimization decisions. At 908, application instances are automatically relocating between the hosting sites based on the optimization decisions. Although illustrated as a single iteration, in practice, the flow can return to 900 from 908 to represent continuous processing.

Figure 10:
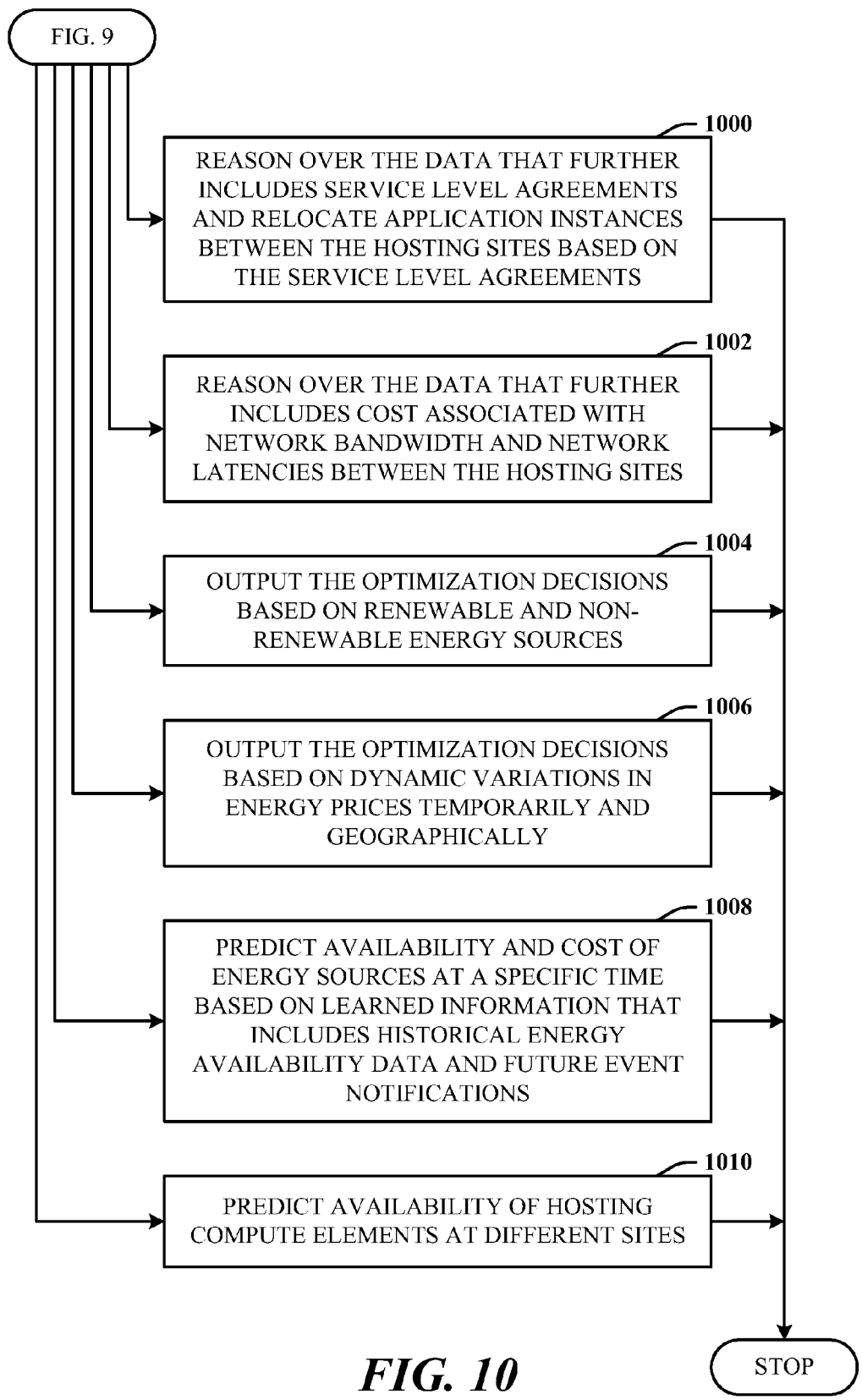
FIG. 10 illustrates further aspects of the method of FIG. 9.

FIG. 10 illustrates further aspects of the method of FIG. 9. Each of the blocks represents a single step that can be added to the method represented by the flow chart of FIG. 9. At 1000, the data further includes service level agreements that are reasoned over and application instances are relocated between the hosting sites based on the service level agreements. At 1002, the data further includes cost associated with network bandwidth and network latencies between the hosting sites that are reasoned over. At 1004, the optimization decisions output are based on renewable and non-renewable energy sources. At 1006, the optimization decisions are output based on dynamic variations in energy prices temporarily and geographically. At 1008, the availability and cost of energy sources at a specific time is predicted based on learned information that includes historical energy availability data and future event notifications. At 1010, the availability of hosting compute elements at different sites is predicted.

Figure 11:
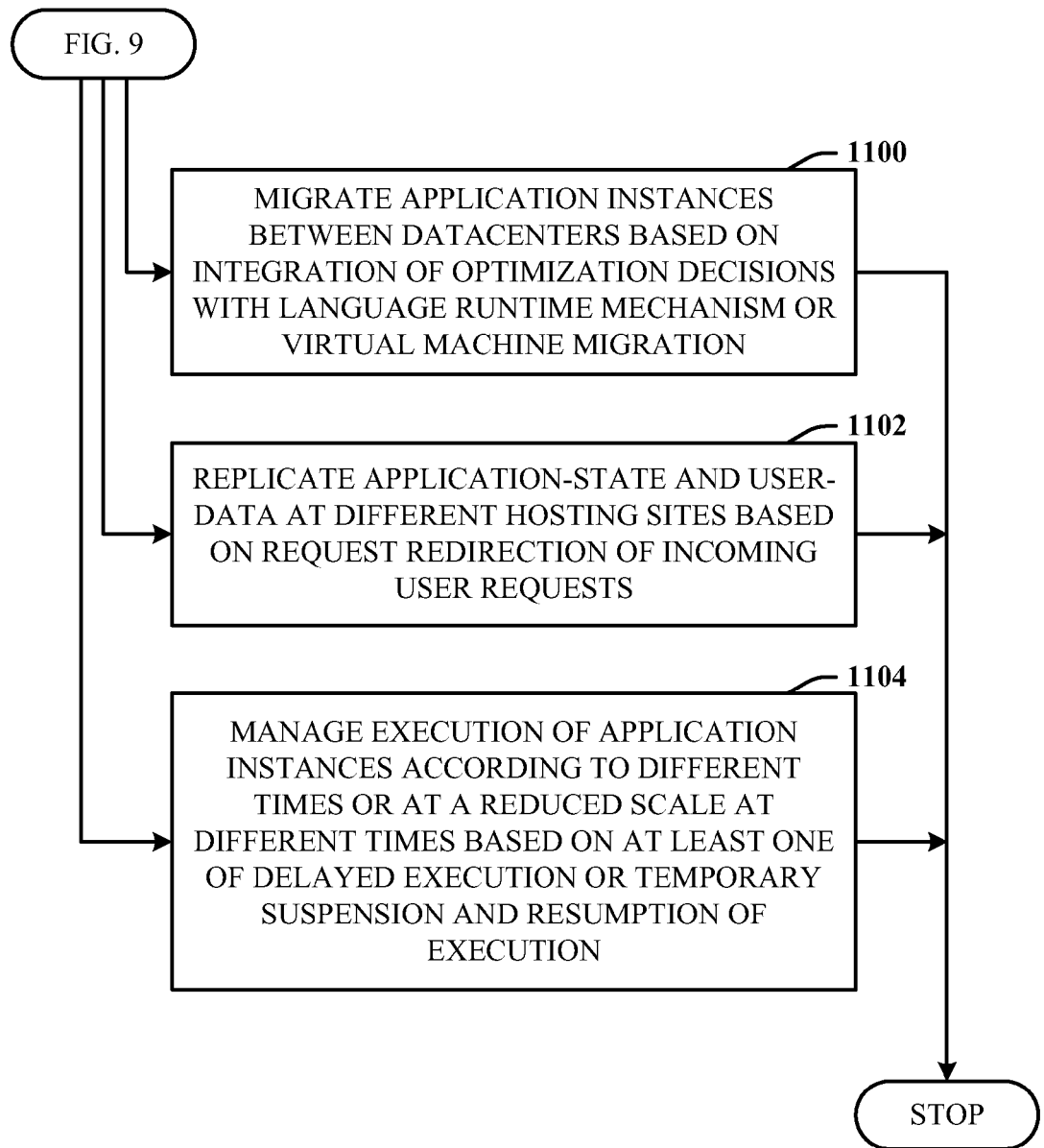
FIG. 11 illustrates further aspects of the method of FIG. 9.

FIG. 11 illustrates further aspects of the method of FIG. 9. At 1100, application instances are migrated between datacenters based on integration of optimization decisions with a language runtime mechanism or virtual machine migration. At 1102, application-state and user-data are replicated at different hosting sites based on request redirection of incoming user requests. At 1104, execution of application instances is managed according to different times or at a reduced scale at different times based on at least one of delayed execution or temporary suspension and resumption of execution.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 12:
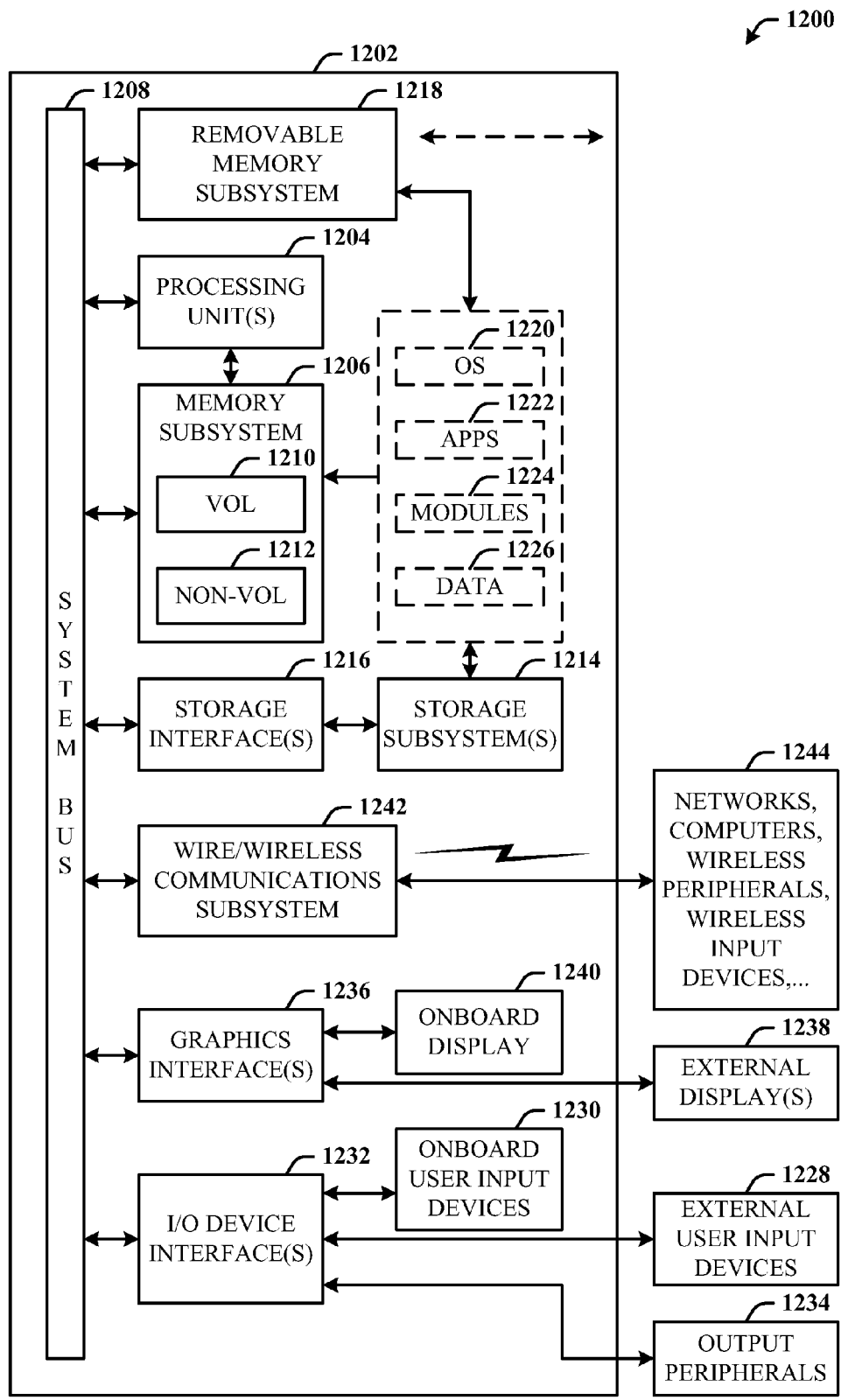
FIG. 12 illustrates a block diagram of a computing system that executes the optimization framework in accordance with the disclosed architecture.

Referring now to FIG. 12, there is illustrated a block diagram of a computing system 1200 that executes the optimization framework in accordance with the disclosed architecture. In order to provide additional context for various aspects thereof, FIG. 12 and the following description are intended to provide a brief, general description of the suitable computing system 1200 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1200 for implementing various aspects includes the computer 1202 having processing unit(s) 1204, a computer-readable storage such as a system memory 1206, and a system bus 1208. The processing unit(s) 1204 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1206 can include computer-readable storage (physical storage media) such as a volatile (VOL) memory 1210 (e.g., random access memory (RAM)) and non-volatile memory (NON-VOL) 1212 (e.g., ROM, EPROM, EEPROM, etc.). A basic input/output system (BIOS) can be stored in the non-volatile memory 1212, and includes the basic routines that facilitate the communication of data and signals between components within the computer 1202, such as during startup. The volatile memory 1210 can also include a high-speed RAM such as static RAM for caching data.

The system bus 1208 provides an interface for system components including, but not limited to, the system memory 1206 to the processing unit(s) 1204. The system bus 1208 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1202 further includes machine readable storage subsystem(s) 1214 and storage interface(s) 1216 for interfacing the storage subsystem(s) 1214 to the system bus 1208 and other desired computer components. The storage subsystem(s) 1214 (physical storage media) can include one or more of a hard disk drive (HDD), a magnetic floppy disk drive (FDD), and/or optical disk storage drive (e.g., a CD-ROM drive DVD drive), for example. The storage interface(s) 1216 can include interface technologies such as EIDE, ATA, SATA, and IEEE 1394, for example.

One or more programs and data can be stored in the memory subsystem 1206, a machine readable and removable memory subsystem 1218 (e.g., flash drive form factor technology), and/or the storage subsystem(s) 1214 (e.g., optical, magnetic, solid state), including an operating system 1220, one or more application programs 1222, other program modules 1224, and program data 1226.

The one or more application programs 1222, other program modules 1224, and program data 1226 can include the entities and components of the system 100 of FIG. 1, the entities and components of the system 200 of FIG. 2, the entities of the hosting site model 208 of FIG. 3, the entities of the application instances model 210 of FIG. 4, the listing and interval computing represented by the charts of FIGS. 5 and 7, the algorithm 600 of FIG. 6, the system 800 of FIG. 8, and the methods represented by the flowcharts of FIGS. 9-11, for example.

Generally, programs include routines, methods, data structures, other software components, etc., that perform particular tasks or implement particular abstract data types. All or portions of the operating system 1220, applications 1222, modules 1224, and/or data 1226 can also be cached in memory such as the volatile memory 1210, for example. It is to be appreciated that the disclosed architecture can be implemented with various commercially available operating systems or combinations of operating systems (e.g., as virtual machines).

The storage subsystem(s) 1214 and memory subsystems (1206 and 1218) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1202 and includes volatile and non-volatile internal and/or external media that is removable or non-removable. For the computer 1202, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1202, programs, and data using external user input devices 1228 such as a keyboard and a mouse. Other external user input devices 1228 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1202, programs, and data using onboard user input devices 1230 such a touchpad, microphone, keyboard, etc., where the computer 1202 is a portable computer, for example. These and other input devices are connected to the processing unit(s) 1204 through input/output (I/O) device interface(s) 1232 via the system bus 1208, but can be connected by other interfaces such as a parallel port, IEEE 1394 serial port, a game port, a USB port, an IR interface, etc. The I/O device interface(s) 1232 also facilitate the use of output peripherals 1234 such as printers, audio devices, camera devices, and so on, such as a sound card and/or onboard audio processing capability.

One or more graphics interface(s) 1236 (also commonly referred to as a graphics processing unit (GPU)) provide graphics and video signals between the computer 1202 and external display(s) 1238 (e.g., LCD, plasma) and/or onboard displays 1240 (e.g., for portable computer). The graphics interface(s) 1236 can also be manufactured as part of the computer system board.

The computer 1202 can operate in a networked environment (e.g., IP-based) using logical connections via a wired/wireless communications subsystem 1242 to one or more networks and/or other computers. The other computers can include workstations, servers, routers, personal computers, microprocessor-based entertainment appliances, peer devices or other common network nodes, and typically include many or all of the elements described relative to the computer 1202. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1202 connects to the network via a wired/wireless communication subsystem 1242 (e.g., a network interface adapter, onboard transceiver subsystem, etc.) to communicate with wired/wireless networks, wired/wireless printers, wired/wireless input devices 1244, and so on. The computer 1202 can include a modem or other means for establishing communications over the network. In a networked environment, programs and data relative to the computer 1202 can be stored in the remote memory/storage device, as is associated with a distributed system. It will be appreciated that the network connections shown are exemplary and other means of establishing a communications link between the computers can be used.

The computer 1202 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 13:
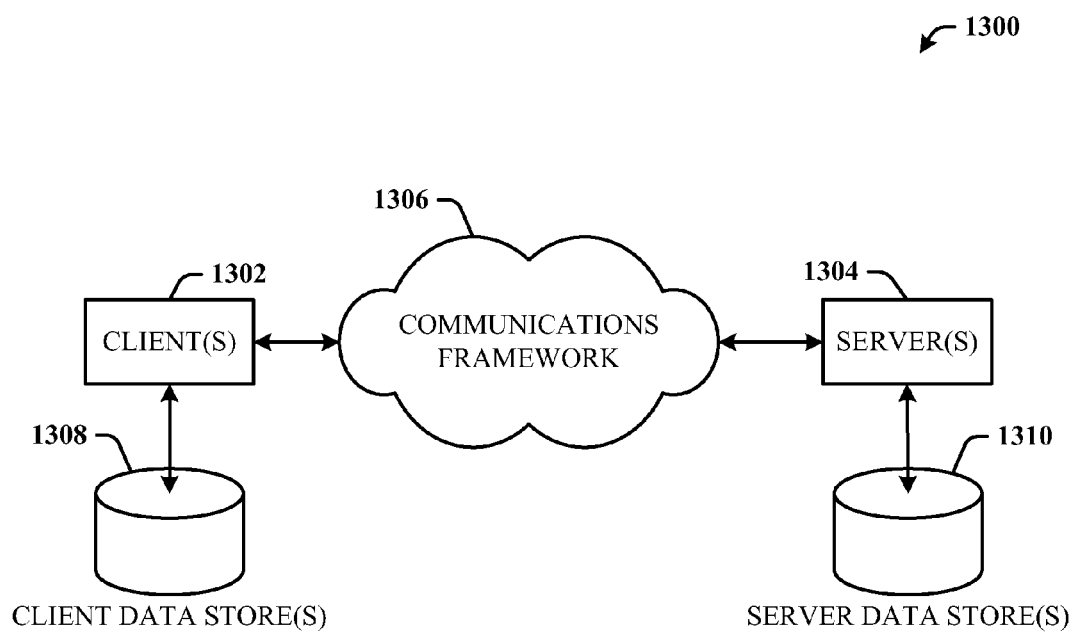
FIG. 13 illustrates a schematic block diagram of a computing environment that performs optimization in accordance with the disclosed architecture.

Referring now to FIG. 13, there is illustrated a schematic block diagram of a computing environment 1300 that performs optimization in accordance with the disclosed architecture. The environment 1300 includes one or more client(s) 1302. The client(s) 1302 can be hardware and/or software (e.g., threads, processes, computing devices). The client(s) 1302 can house cookie(s) and/or associated contextual information, for example.

The environment 1300 also includes one or more server(s) 1304. The server(s) 1304 can also be hardware and/or software (e.g., threads, processes, computing devices). The servers 1304 can house threads to perform transformations by employing the architecture, for example. One possible communication between a client 1302 and a server 1304 can be in the form of a data packet adapted to be transmitted between two or more computer processes. The data packet may include a cookie and/or associated contextual information, for example. The environment 1300 includes a communication framework 1306 (e.g., a global communication network such as the Internet) that can be employed to facilitate communications between the client(s) 1302 and the server(s) 1304.

Communications can be facilitated via a wire (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method comprising:

for hosting sites that run application instances to process workload:
   tracking realtime energy parameters associated with the hosting sites and energy resources for the hosting sites, and
   tracking realtime availability of computing resources associated with the hosting sites;

constructing a framework including:
   a hosting sites model that associates the realtime energy parameters and the realtime availability of the computing resources with operation of the hosting sites;
   an application instances model that associates the application instances with the computing resources and the energy resources, wherein the application instances model includes power footprints and memory footprints for individual application instances;

solving the framework to output decisions based on the hosting sites model and the application instances model, wherein the solving considers the realtime energy parameters, the realtime availability of the computing resources, and the power footprints and the memory footprints for the individual application instances; and automatically migrating at least some of the application instances between the hosting sites based on the decisions from the solving the framework.

2. The method of claim 1, wherein the solving the framework further considers service level agreements associated with the application instances.

3. The method of claim 1, wherein the solving the framework further considers costs of the automatically migrating, other costs associated with network bandwidth, and network latencies between the hosting sites.

4. The method of claim 1, wherein the realtime energy parameters include costs and availability of the energy resources, and the energy resources include both renewable and non-renewable energy sources.

5. The method of claim 1, wherein the realtime energy parameters include both temporal and geographical dynamic variations in energy prices of the energy resources.

6. The method of claim 1, further comprising:
simulating future availability and cost of the energy resources based on historical energy pricing and availability data,
wherein the solving the framework further considers the simulated future availability and cost of the energy resources.

7. The method of claim 6, wherein the energy resources include both renewable and non-renewable energy resources.

8. The method of claim 1, further comprising:
redirecting incoming user requests to selected hosting sites based on the decisions from the solving the framework.

9. The method of claim 1, further comprising:
managing power states of the hosting sites based on the decisions.

10. A power control system comprising:
a processor and a storage device;
a data collector stored on the storage device and executable by the processor, the data collector configured to collect computing parameters related to a plurality of datacenter servers, the computing parameters reflecting availability of computing elements;
a simulator stored on the storage device and executable by the processor, the simulator configured to:
collect historical parameters and realtime energy parameters of the datacenter servers reflecting availability of renewable and non-renewable energy sources and dynamic variations in energy prices, and
calculate data points relating to the historical parameters and the realtime energy parameters for designated time intervals;
a data processing engine stored on the storage device and executable by the processor, the data processing engine configured to correlate the computing parameters and the data points for the designated time intervals from the data collector and the simulator to produce correlated data related to the designated time intervals;
a decision component stored on the storage device and executable by the processor, the decision component configured to receive the correlated data from the data processing engine and to make decisions based on a framework including a hosting site model, an application instance model, and a location energy model, the decisions related to power state changes of the hosting sites associated with the designated time intervals; and
a power state actuator stored on the storage device and executable by the processor, the power state actuator configured to receive the decisions from the decision component and to manage power state changes associated with the received decisions within the designated time intervals.

11. The power control system of claim 10, wherein the simulator is further configured to collect the realtime energy parameters by computing the availability of an individual energy source based on predicted power available from the individual energy source for a specific datacenter server for a specific time.

12. The power control system of claim 10, wherein the decisions made by the decision component are based on reducing monetary costs of operating the plurality of datacenter servers.

13. The power control system of claim 10, wherein the decisions made by the decision component are based on reducing impact on user interactiveness.

14. The power control system of claim 10, wherein the decisions made by the decision component are based on increasing long term availability of the computing elements.

15. The power control system of claim 10, wherein the decisions made by the decision component are based on increasing use of the renewable energy sources.

16. The power control system of claim 10, wherein the decisions made by the decision component are based on reducing carbon footprint and pollutant emission due to electricity used in operation of the plurality of datacenter servers.

17. The power control system of claim 10, wherein the decisions made by the decision component are based on balancing bandwidth cost and energy cost.

18. The power control system of claim 10, wherein the application instance model is based on information related to at least one of processor usage and memory footprint size of an individual application instance, number of network connections maintained by the individual application instance, power footprint of the individual application instance, service level agreements on hosting of the individual application instance, or latency threshold for migrating the individual application instance between two sites.

19. A computer-implemented method, comprising:
receiving data related to servers, the data reflecting historical parameters of computing elements and energy sources, realtime energy parameters for the energy sources, and availability of the computing elements, wherein the energy sources comprise both renewable and non-renewable energy sources;
accessing a framework that includes:
a hosting site model associated with operations of the servers,
an application instances model of application instances that are run on the servers, and
a location energy model that estimates power consumption at the servers;
entering the received data into the framework to make server power state decisions based on the received data; and
automatically relocating individual application instances between the servers based on the server power state decisions.

20. The method of claim 19, the data further reflecting availability of an individual energy source, the availability being based on predicted power available from the individual energy source to a specific server for a specific time.

21. The method of claim 19, wherein the server power state decisions are based on at least one of reducing monetary costs for running the application instances, reducing impact on user interactiveness, increasing long term availability of the computing elements, increasing use of the renewable energy sources, reducing carbon footprint and pollutant emission due to the power consumption at the servers, or balancing bandwidth cost and energy cost.

* * * * *